(12) United States Patent
Kim et al.

(10) Patent No.: US 10,387,014 B2
(45) Date of Patent: Aug. 20, 2019

(54) MOBILE TERMINAL FOR CONTROLLING ICONS DISPLAYED ON TOUCH SCREEN AND METHOD THEREFOR

(71) Applicants: Samsung Electronics Co., Ltd., Gyeonggi-do (KR); Industry-Academic Cooperation Foundation, Yonsei University, Seoul (KR)

(72) Inventors: So-Young Kim, Seoul (KR); Yong-Gu Ji, Seoul (KR); Sung-Joo Ahn, Seoul (KR); Hwan Hwangbo, Seoul (KR); Hyo-Chang Kim, Seoul (KR); Jung-Hoon Park, Seoul (KR); Hyung-Jun Oh, Seoul (KR); Hyun-Guk Yoo, Gyeonggi-do (KR); Gyeong-Ho Chu, Daegu (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 514 days.

(21) Appl. No.: 14/770,013

(22) PCT Filed: Feb. 20, 2014

(86) PCT No.: PCT/KR2014/001368
§ 371 (c)(1),
(2) Date: Aug. 24, 2015

(87) PCT Pub. No.: WO2014/129813
PCT Pub. Date: Aug. 28, 2014

(65) Prior Publication Data
US 2016/0004416 A1    Jan. 7, 2016

(30) Foreign Application Priority Data
Feb. 22, 2013 (KR) .......................... 10-2013-0019467

(51) Int. Cl.
G06F 3/0482 (2013.01)
G06F 3/0485 (2013.01)
(Continued)

(52) U.S. Cl.
CPC ........ *G06F 3/04845* (2013.01); *G06F 3/0412* (2013.01); *G06F 3/0416* (2013.01);
(Continued)

(58) Field of Classification Search
CPC .......................... G06F 3/04817; G06F 3/017
See application file for complete search history.

(56) References Cited

U.S. PATENT DOCUMENTS

2006/0048071 A1    3/2006 Jarrett et al.
2007/0101288 A1*   5/2007 Forstall ............... G06F 3/04817
                                                   715/781
(Continued)

FOREIGN PATENT DOCUMENTS

KR    1020110025394    3/2011
KR    1020110032794    3/2011
(Continued)

OTHER PUBLICATIONS

PCT/ISA/210 Search Report issued on PCT/KR2014/001368 (pp. 6).
PCT/ISA/237 Written Opinion issued on PCT/KR2014/001368 (pp. 10).

*Primary Examiner* — Rayeez R Chowdhury
(74) *Attorney, Agent, or Firm* — The Farrell Law Firm, P.C.

(57) ABSTRACT

A method and a mobile terminal for controlling the icons of the mobile terminal are provided. The method includes displaying at least one icon on a widget screen corresponding with a function for changing the size of the icon displayed on a touch screen; receiving a selection of an icon
(Continued)

to which the function is to be applied; activating an attribute of the selected icon; and adjusting, if a side of the selected icon is dragged on the widget screen, a size of the selected icon according to a direction of the drag.

6 Claims, 34 Drawing Sheets

(51) Int. Cl.
  G06F 3/0484 (2013.01)
  H04M 1/725 (2006.01)
  G06F 3/0488 (2013.01)
  G06F 3/041 (2006.01)
  G06F 3/0481 (2013.01)
  G06F 3/0486 (2013.01)

(52) U.S. Cl.
  CPC .......... G06F 3/0482 (2013.01); G06F 3/0485 (2013.01); G06F 3/0486 (2013.01); G06F 3/04817 (2013.01); G06F 3/04842 (2013.01); G06F 3/04883 (2013.01); G06F 3/04886 (2013.01); H04M 1/72563 (2013.01); G06F 2203/04806 (2013.01); H04M 2250/22 (2013.01)

(56) References Cited

U.S. PATENT DOCUMENTS

| | | | |
|---|---|---|---|
| 2007/0152984 A1* | 7/2007 | Ording | G06F 3/04845 345/173 |
| 2009/0046075 A1* | 2/2009 | Kim | G06F 3/0488 345/173 |
| 2009/0058821 A1 | 3/2009 | Chaudhri et al. | |
| 2010/0169828 A1 | 7/2010 | Kho et al. | |
| 2011/0087981 A1 | 4/2011 | Jeong et al. | |
| 2011/0210933 A1 | 9/2011 | Forstall | |
| 2011/0239145 A1 | 9/2011 | Kim | |
| 2012/0159386 A1* | 6/2012 | Kang | G06F 3/0481 715/800 |
| 2012/0176382 A1* | 7/2012 | Noh | G06F 3/0488 345/428 |
| 2012/0192110 A1* | 7/2012 | Wu | G06F 3/04817 715/815 |
| 2012/0262484 A1* | 10/2012 | Gottfeld | G09B 5/065 345/632 |
| 2012/0306766 A1 | 12/2012 | Moore | |
| 2013/0268875 A1* | 10/2013 | Han | G06F 3/0481 715/769 |
| 2013/0305187 A1* | 11/2013 | Phillips | G06F 3/04817 715/800 |
| 2013/0311920 A1* | 11/2013 | Koo | G06F 3/04883 715/765 |
| 2014/0114794 A1* | 4/2014 | Wolf | G06Q 30/0643 705/26.5 |

FOREIGN PATENT DOCUMENTS

| | | |
|---|---|---|
| KR | 1020110038869 | 4/2011 |
| KR | 1020110107939 | 10/2011 |
| KR | 1020120029724 | 3/2012 |
| KR | 1020120046334 | 5/2012 |

* cited by examiner

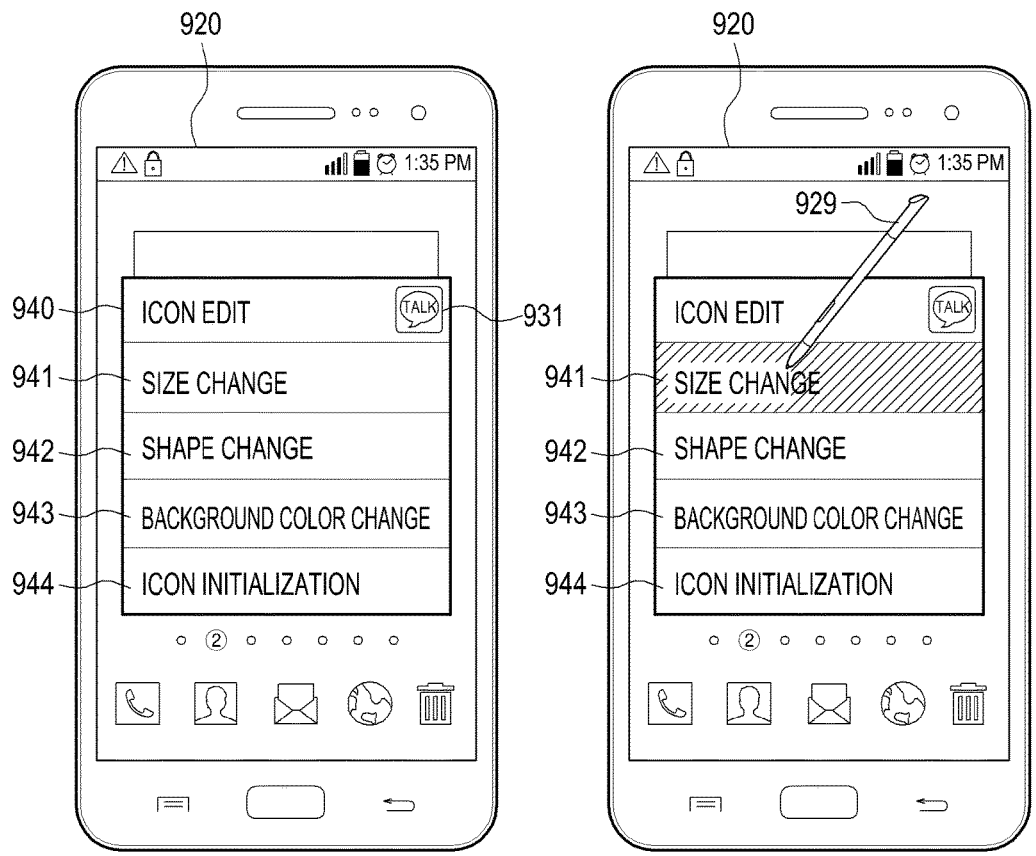

MOBILE TERMINAL FOR CONTROLLING ICONS DISPLAYED ON TOUCH SCREEN AND METHOD THEREFOR

PRIORITY

This application is a U.S. National Stage Entry of International Application PCT/KR2014/001368, filed on Feb. 20, 2014, which claims priority to Korean Application No. 10-2013-0019467, filed on Feb. 22, 2013, the contents of each of which are incorporated herein by reference.

BACKGROUND OF THE INVENTION

1. Field of the Invention

The present invention relates generally to a mobile terminal, and more particularly, to a mobile terminal and a method for controlling icons displayed on a touch screen.

2. Description of the Related Art

In recent years, the variety of services and additional functions provided by mobile terminals has been gradually expanding. In order to raise the effectiveness of these mobile terminals and to meet various needs of users, a variety of applications that are executable in the mobile terminals have been developed.

Accordingly, up to several hundreds of applications can be stored in the latest mobile terminals, such as a smart phone, a tablet Personal Computer (PC), or the like. Icons for executing the respective applications are displayed on a touch screen of the mobile terminal. Thus, a user can execute a desired application in the mobile terminal by touching an icon corresponding to the desired application displayed on the touch screen. In addition, various types of visual objects such as widgets, pictures, documents, etc., in addition to the shortcut icons have been displayed on the touch screen of mobile terminals.

Mobile terminals may have small icons displayed on the screen, due to the narrow touch screen caused by characteristics of the terminals. Therefore, there may be difficulties in the confirmation and control of information compared to a desktop or a laptop computer. In addition, a user with limited vision who has a limited viewing angle and low level of visual acuity compared to a general user, may find that small application icons or names of icons are difficult to be visually recognized, which may lead to the degradation of the accessibility of use of mobile terminals. Therefore, there are demands for a method of increasing the readability of the icons in the mobile terminal.

SUMMARY

Therefore, the present invention has been made to address the above-mentioned problems and to provide at least the advantages described below. An aspect of the present invention is to increase the readability of users with low vision by freely magnifying or reducing icons displayed on a touch screen of a mobile terminal or freely changing sizes, shapes, background colors, etc. of the icons. Accordingly, an aspect of the present invention is to provide a mobile terminal and a method for controlling icons displayed on a touch screen, which may increase the readability of users with low vision by freely changing sizes, shapes, background colors, etc. of the icons in the mobile terminal including at least one touch screen.

According to an aspect of the present invention, a method for controlling icons of a mobile terminal is provided. The method includes displaying at least one icon on a widget screen to correspond to a function for changing sizes of the icons on a touch screen for displaying the at least one icon; receiving a selection of an icon to which the function is to be applied; activating an attribute of the selected icon; and adjusting, when a side of the selected icon is dragged on the widget screen, a size of the selected icon according to a direction of the drag.

According to another aspect of the present invention, a mobile terminal for controlling icons, the mobile terminal is provided. The mobile terminal includes a touch screen configured to display at least one icon on a widget screen to correspond to a function for changing a size of an icon displayed on a touch screen; and a controller that configured to receive a selection of an icon to which the function is to be applied, to activate an attribute of the selected icon, and to adjust, if a side of the selected icon is dragged on the widget screen, a size of the selected icon according to a direction of the drag.

According to another aspect of the present invention, a mobile terminal that controls icons, the mobile terminal is provided. The mobile terminal includes a touch screen configured to display at least one icon on a widget screen according to a function for controlling an icon displayed on a touch screen; and a controller configured to receive a selection of an icon, controls display of, one the widget screen, at least one function applicable to the selected icon according to the selection of the icon, to receive a selection of a function from among the at least one function, and to control an attribute of the selected icon according to the selected function, wherein the touch screen is further configured to display an icon to which the attribute is applied under the control of the controller.

According to another aspect of the present invention, a method for controlling display of at least one icon displayed on a touch screen is provided. The method includes detecting a touch input on the touch screen; calculating a distance dragged by the touch; comparing the calculated distance and a predetermined threshold range; and controlling a page view scrolled on the touch screen to correspond to a result of the comparison. According to an aspect of the present invention, it is possible to improve the accessibility of users with low vision and extend the range of selection for screen adjustment of general users, by freely changing sizes, shapes, background colors, etc. of icons in a mobile terminal including at least one touch screen.

BRIEF DESCRIPTION OF THE DRAWINGS

The above and other aspects, features, and advantages of the present invention will be more apparent from the following description, taken in conjunction with the accompanying drawings, in which:

FIG. 9E is a diagram illustrating an example of displaying a plurality of functions applicable to a selected icon according to an embodiment of the present invention;

FIG. 9F is a diagram illustrating an example in which a size change function of an icon is selected from a plurality of functions according to an embodiment of the present invention;

DETAILED DESCRIPTION OF EMBODIMENTS OF THE INVENTION

Figure 1:
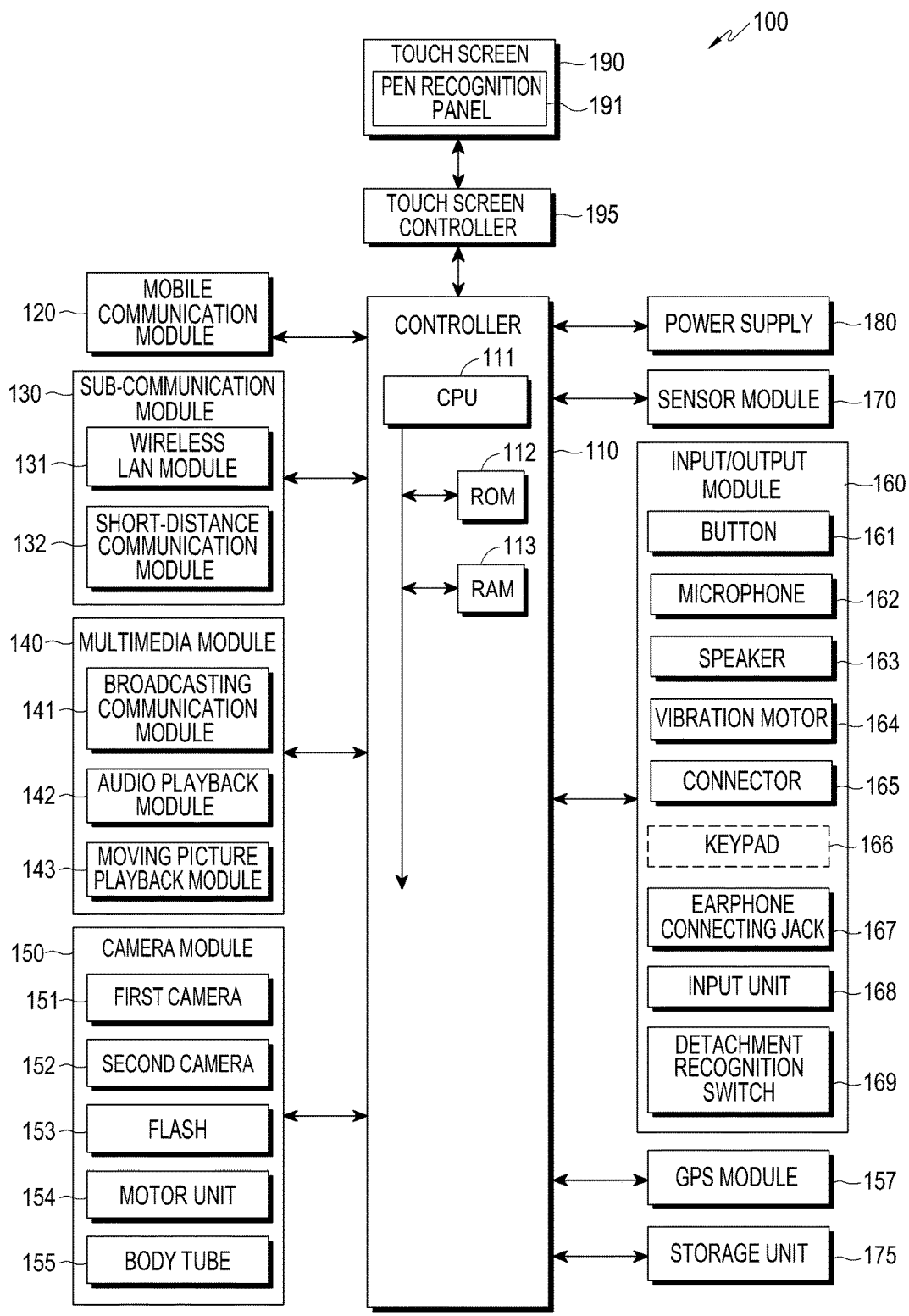
FIG. 1 is a schematic block diagram illustrating a mobile terminal that provides a haptic effect according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Although terms including an ordinal number such as first, second, etc. can be used to describe various elements, structural elements are not restricted by the terms. Such terms are used merely for the purpose distinguishing an element from other elements. For example, a first element may be referred to as a second element, and similarly, a second element may also be referred to as a first element without departing from the scope of embodiments the present invention. As used herein, the term "and/or" includes any and all combinations of one or more associated items.

The terms used in this application to describe particular embodiments are not intended to limit the invention. As used herein, the singular forms of terms are intended to include the plural forms the corresponding terms as well, unless the context clearly indicates otherwise. In the description, the terms "include" or "have" indicate existence of a feature, a number, a step, an operation, a structural element, parts, or a combination thereof, and do not exclude the existence or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present invention belongs. It should be interpreted that the terms that are identical to those defined in general dictionaries, have the same meaning in the context of the related technique. The terms should not be ideally or excessively interpreted as a formal definition.

Hereinafter, an operation principle of embodiments of the present invention will be described in detail with reference to the accompanying drawings. In the following description of an embodiment of the present invention, a detailed description of known configurations or functions incorporated herein will be omitted when such a description obscure the subject matter of the present invention. The terms described below are terms defined in consideration of the functions in embodiments of the present invention, and may be different according to users, intentions of the users, or customs. Accordingly, the terms should be defined on the basis of the overall context of the embodiments of the present invention.

First, certain terms used in the description of embodiments of the present will be defined as follows.

Mobile terminal: a mobile terminal refers to a portable electronic device capable of achieving data transmission/reception, and achieving voice/video calls. A mobile terminal may include one or more touch screens. Such a mobile terminal may include smart phone, tablet Personal Computer (PC), Three-Dimensional (3D)-TeleVision TV) TV, smart TV, Light Emitting Diode (LED) TV, Liquid Crystal Display (LCD TV), and the like, and also include a terminal capable of communicating with peripherals or other terminals located in remote areas.

Input unit: An input unit may be, for example, a finger, an electronic pen, or a stylus pen, all of which may provide commands or inputs to a user terminal in a state in which a touch is made on a touch screen or even in a non-contact state such as hovering.

Object: An object is an item that is displayed or to be displayed on a touch screen of a mobile terminal, and may include, for example, a widget, a picture, a moving picture, an e-mail, a stationery, a Short Message Service (SMS) message, and a Multi-Media Service (MMS) message. An object can be executed, removed, canceled, stored, and changed by an input unit. An object may also be used as an inclusive concept including a shortcut icon, a thumbnail image, and a folder that stores at least one object in a mobile terminal.

Icon (or shortcut icon): An icon is displayed on a touch screen of a mobile terminal in order to rapidly execute respective applications, or execute calls, contact information, menus, and the like that are basically provided from a mobile terminal. When commands or inputs for executing these are input via an icon, the mobile terminal executes corresponding application.

FIG. 1 is a schematic block diagram illustrating a mobile terminal that provides a haptic effect according to an embodiment of the present invention.

Referring to FIG. 1, a mobile terminal 100 may be connected to external devices using at least one of a mobile communication module 120, a sub-communication module 130, a connector 165, and an earphone connecting jack 167. Such external devices may include various devices such as earphones, external speakers, Universal Serial Bus (USB)

storage devices, chargers, cradle/docks, Digital Multimedia Broadcasting (DMB) antennas, mobile payment-related devices, healthcare devices (e.g., blood glucose meters), game consoles, car navigation devices, and the like, which can be detachably mounted to the mobile terminal 100 and connected to the mobile terminal 100 by wires. In addition, the external devices may include Bluetooth communication devices, Near Field Communication (NFC) devices, Wi-Fi Direct communication devices, and wireless Access Points (APs), which can be wirelessly connected to the user terminal 100. The mobile terminal may be connected to other devices, i.e., mobile phones, smart phones, tablet PCs, desktop PCs, and servers by wires or wirelessly.

Referring to FIG. 1, the mobile terminal 100 includes at least one touch screen 190 and at least one touch screen controller 195. In addition, the mobile terminal 100 includes a controller 110, the mobile communication module 120, the sub-communication module 130, a multimedia module 140, a camera module 150, a Global Positioning System (GPS) module 157, an input/output module 160, a sensor module 170, a storage unit 175, and a power supply unit 180.

The sub-communication module 130 includes a wireless LAN module 131 and a short-distance communication module 132, and the multimedia module 140 includes a broadcasting communication module 141, an audio playback module 142, and a moving picture playback module 143. The camera module 150 includes a first camera 151 and a second camera 152. In addition, the camera module 150 of the mobile terminal 100 according to the present invention includes at least one of a body tube 155 for zoom-in/zoom-out of the first/second cameras 151 and 152 according to the main purpose of the mobile terminal 100, a motor unit 154 for controlling movement of the body tube 155 for zoom-in/zoom-out of the body tube 155, and a flash 153 for providing a light source for photographing. The input/output module 160 includes buttons 161, a microphone 162, a speaker 163, a vibration motor 164, a connector 165, and a keypad 166.

The controller 110 includes a Central Processing Unit (CPU) 111, a Read-Only Memory (ROM) 112 in which a control program for controlling the mobile terminal 100 is stored, and a Random Access Memory (RAM) 113 that stores signals or data input from the outside of the mobile terminal 100 or is used as a storage region for operations executed in the mobile terminal 100. The CPU 111 may include a single-core, a dual-core, a triple-core, or a quad-core processor. The CPU 111, the ROM 112, and the RAM 113 may be interconnected via an internal bus.

In addition, the controller 110 controls the mobile communication module 120, the sub-communication module 130, the multimedia module 140, the camera module 150, the GPS module 157, the input/output module 160, the sensor module 170, the storage unit 175, the power supply unit 180, the touch screen 190, and the touch screen controller 195.

In addition, while a plurality of objects are displayed on the touch screen 190, the controller 110 determines whether hovering is recognized as a touchable input unit 168 (e.g., such as an electronic pen approaches any one object), or determines whether the touch screen 190 is touched by the input unit 168. In addition, the controller 110 may detect a height (i.e., distance) from the mobile terminal 100 to the input unit 168, and a hovering input determined based on the height. That is, the controller 110 detects a hovering input by the input unit 168 on the touch screen 190 or a touch input that occurs by touching the input unit 168 on the touch screen 190.

The controller 110 determines an event or a movement of the input unit 168 on the touch screen that displays at least one object, and controls display of the corresponding result on the touch screen. The controller 110 activates an attribute of a selected icon that corresponds to a function for changing a size of at least one icon displayed on the touch screen, and controls the size of the selected icon to correspond to a direction of dragging one side of the selected icon on a widget screen. To perform this operation, the controller 110 detects a touch of a user's finger (or the input unit) input on the touch screen. Next, when the touch of the user's finger is maintained in an execution region of a specific application icon for at least a predetermined time, and then released, the controller 110 controls display of an outer boundary of a cell in which the corresponding application icon is disposed, as a bold line. In this instance, the predetermined time refers to a touch or press that is longer than a tap operation in which a single touch is made on the screen by the user's finger and then released. When the user's finger touches the boundary displayed by the bold line, the corresponding boundary becomes in a state of being selected, and when the user drags the boundary to a desired region of the screen without releasing the touch of the user's finger on the selected corresponding boundary, the boundary of the corresponding cell is magnified or reduced. An application icon that is present in the corresponding cell and a size of text indicating an icon's name are also magnified or reduced. When the touch of the finger is released by the user, a final magnifying or reducing condition until immediately before releasing the touch of the finger are fixed as the size of the corresponding cell, and the application icon and the size of the text indicating the icon's name are also accordingly fixed. The widget screen allocates a display region to the at least one icon displayed on the touch screen, and displays the at least one icon to which the display region is allocated. Here, the size of the display region is variable. In addition, the controller 110 controls display of at least one function applicable to the selected icon to correspond to the selection of the icon displayed on the widget screen, and controls an attribute of the selected icon to correspond to the function selected from the displayed at least one function. The at least one function includes functions for adjusting a size, a shape, and a background color of the corresponding icon.

In addition, the controller 110 detects a touch input on the touch screen, calculates a distance dragged by the input touch, compares the calculated distance and a predetermined threshold range, and controls a page view of the touch screen to correspond to the compared result. More specifically, when the touch is a pinch zoom-in or a pinch zoom-out that simultaneously touches two points, the controller 110 adjusts the number of icons displayed on the touch screen, and adjusts the number of pages displayed on the touch screen to correspond to the adjusted number of icons. For example, when the touch is the pinch zoom-in, the controller 110 displays the predetermined number of icons on the touch screen to correspond to a distance dragged by the pinch zoom-in, and the number of pages is increased. When the touch is the pinch zoom-out, the controller 110 displays the predetermined number of icons on the touch screen to correspond to a distance dragged by the pinch zoom-out, and the number of pages is reduced. In addition, when the touch is a dragging movement from a first point to a second point, the controller 110 controls display of the predetermined number of pages to correspond to the dragged distance. In addition, the controller 110 aligns the at least one icon displayed on the touch screen, in an alphabetical order or in order of names.

The mobile communication module 120 allows the mobile terminal 100 to be connected to the external device through mobile communication using at least one antenna according to the control of the controller 110. The mobile communication module 120 transmits/receives wireless signals for voice calls, video calls, SMS messages, or MMS messages to and from mobile phones having their respective phone numbers input to the mobile terminal 100, a smart phone (not illustrated), a tablet PC, or other devices.

The sub-communication module 130 includes the wireless LAN module 131 and the short-distance communication module 132. According to other embodiments of the present invention, the sub-communication module 130 may include only the wireless LAN module 131, or include only the short-distance communication module 132.

The wireless LAN module 131 is able to connect to the Internet in a place in which a wireless Access Point (AP) is installed, according to the control of the controller 110. The wireless LAN module 131 supports the wireless LAN standard, i.e., the Institute of Electrical and Electronics Engineers (IEEE) 802.11x. The short-distance communication module 132 wirelessly performs short-distance communication between the mobile terminal 100 and an image forming apparatus according to the control of the controller 110. A short-distance communication scheme may include Bluetooth, Infrared Data Association (IrDA) communication, Wi-Fi Direct communication, NFC, and the like.

The controller 110 transmits control signals according to a haptic pattern to the input unit via at least one of the sub-communication module 130 and the wireless LAN module 131.

According to other embodiments of the present invention, mobile terminal 100 may include at least one of the mobile communication module 120, the wireless LAN module 131, and the short-distance communication module 132 according to the performance of the mobile terminal 100. In addition, the mobile terminal 100 may include a combination of the mobile communication module 120, the wireless LAN module 131, and the short-distance communication module 132 according to the performance of the mobile terminal 100. According to some embodiments of the present invention, at least one of or a combination of the mobile communication module 120, the wireless LAN module 131, and the short-distance communication module 132 is referred to as a transceiving unit.

The multimedia module 140 includes the broadcasting communication module 141, the audio playback module 142, and the moving picture playback module 143. The broadcasting communication module 141 receives a broadcasting signal (e.g., a TV broadcasting signal, a radio broadcasting signal, or a data broadcasting signal) and broadcasting subsidiary information (e.g., an Electronic Program Guide (EPG)) or an Electronic Service Guide (ESG), which are transmitted from a broadcasting station, through a broadcasting communication antenna based on the control of the controller 110. The audio playback module 142 plays back a stored or received digital audio file (of which a file extension is mp3, wma, ogg, or way) according to the control of the controller 110. The moving picture playback module 143 plays back a stored or received digital moving picture file (of which a file extension is mpeg, mpg, mp4, avi, mov, or mkv) according to the control of the controller 110. The moving picture playback module 143 may play back a digital audio file.

According to another embodiment of the present invention, multimedia module 140 may include the audio playback module 142 and the moving picture playback module 143, but without the broadcasting communication module 141. In addition, the audio playback module 142 or the moving picture playback module 143 of the multimedia module 140 may be included in the controller 110.

The camera module 150 includes the first camera 151 and the second camera 152 that capture a still image or a moving picture based on the control of the controller 110. In addition, the camera module 150 may include at least one of the body tube 155 that performs zooming in/out for capturing a subject, the motor unit 154 that controls a movement of the body tube 155, and the flash 153 that provides an auxiliary light source required for capturing a subject. The first camera 151 may be disposed on a front side of the mobile terminal 100, and the second camera 152 may be disposed on a back side of the mobile terminal 100. In another embodiment of the present invention, the first camera 151 and the second camera 152 are disposed close to each other (for example, a distance between the first camera 151 and the second camera 152 is greater than 1 cm and less than 8 cm) and thus, a three-dimensional (3D) still image or a 3D moving picture is captured.

In addition, the first and second cameras 151 and 152 may respectively include a lens system, an image sensor, and the like. Each of the first and second cameras 151 and 152 convert an optical signal input (or captured) through the lens system into an electric image signal and output the image signal to the controller 110, and a user captures a moving picture or a still image through the first and second cameras 151 and 152.

The GPS module 157 receives electric waves from a plurality of GPS satellites in the Earth's orbit, and calculates a location of the mobile terminal 100 based on a Time Of Arrival (TOA) of radio waves from a GPS satellite to the mobile terminal 100.

The input/output module 160 include the plurality of buttons 161, the microphone 162, the speaker 163, the vibration motor 164, the connector 165, the keypad 166, the earphone connecting jack 167, and the input unit 168. The input/output module 160 is not limited thereto, and a cursor controller such as a mouse, a track ball, a joystick, or cursor direction keys may be provided for controlling a movement of a cursor on the touch screen 190.

The buttons 161 may be formed on a front side, a lateral side, or a back side of a housing of the mobile terminal 100, and include at least one of a power/lock button, a volume button, a menu button, a home button, a back button, and a search button 161.

The microphone 162 receives an input of a voice or a sound and generates an electric signal according to the control of the controller 110.

The speaker 163 outputs, to the outside of the mobile terminal 100, sounds corresponding to a variety of signals (e.g., a wireless signal, a broadcasting signal, a digital audio file, a digital moving picture file, an image capturing signal, etc.) of the mobile communication module 120, the sub-communication module 130, the multimedia module 140, or the camera module 150 according to the control of the controller 110. In addition, the speaker 163 may output a sound corresponding to a control signal provided to the input unit 168 through the short-distance communication module 132. The sound corresponding to the control signal includes a sound associated with activation of a vibration device 520 of the input unit 168, a sound of which a volume varies based on vibration intensity, and a sound associated with deactivation of the vibration device 520. The volume of the sound may be controlled based on the vibration intensity of the vibration device 520 of the input unit 168, or the sound may be output through the speaker 163 of the mobile terminal 100 and/or a speaker 560 included in the input unit 168 when activating the vibration device 520 or at a predetermined time interval (for example, 10 ms) before/after the activation. In addition, the sound may be terminated when deactivating the vibration device 520 or at a predetermined time interval (for example, 10 ms) before/after the deactivation. The speaker 163 may output a sound (e.g., a button manipulation sound corresponding to a phone call or a ring-back tone) corresponding to a function performed by the mobile terminal 100. One or more speakers 163 may be formed on an appropriate location or locations of the housing of the mobile terminal 100.

The vibration motor 164 converts an electric signal into a mechanical vibration based on the control of the controller 110. For example, when the mobile terminal 100 in a vibration mode receives a voice call from another device, the vibration motor 164 operates. One or more vibration motors 164 may be formed in the housing of the mobile terminal 100. The vibration motor 164 may operate in response to a touch motion of a user who touches the touch screen 190 or successive motions of a touch on the touch screen 190.

The connector 165 is an interface for connecting the mobile terminal 100 and an external device or a power source. Based on the control of the mobile terminal 100, the controller 110 may transmit or receive data stored in the storage unit 175 of the mobile terminal 100 to or from the external device through a wired cable connected to the connector 165. In addition, through the wired cable connected to the connector 165, the mobile terminal 100 may receive an input of power from a power source or charge a battery using the power source.

The keypad 166 receives key input from the user in order to control the mobile terminal 100. The keypad 166 may include a physical keypad formed on the mobile terminal 100 or a virtual keypad displayed on the touch screen 190. The physical keypad formed on the mobile terminal 100 may be excluded from the mobile terminal 100 depending on the performance or configuration of the mobile terminal 100.

Earphones may be inserted into the earphone connecting jack 167 to connect to the mobile terminal 100, and the input unit 168 may be inserted into the mobile terminal 100 for storage. When used, the earphones may be taken out of or detached from the mobile terminal 100. In a portion of the inside of the mobile terminal 100 into which the input unit 168 is inserted, a detachment recognition switch 169 that operates in response to attachment and detachment of the input unit 168 is included, so that a signal corresponding to the attachment and detachment of the input unit 168 may be provided to the controller 110. The detachment recognition switch 169 is included in the portion into which the input unit 168 is inserted and thus, may directly or indirectly be in contact with the input unit 168 when the input unit 168 is attached. Accordingly, the detachment recognition switch 169 generates a signal corresponding to the attachment or detachment of the input unit 168 based on the direct or indirect contact with the input unit 168, and provides the generated signal to the controller 110.

The sensor module 170 includes at least one sensor that detects a state of the mobile terminal 100. For example, the sensor module 170 may include a proximity sensor to detect a proximity of the user to the mobile terminal 100, an illuminance sensor to detect an amount of light around the mobile terminal 100, a motion sensor to detect a motion of the mobile terminal 100 (e.g., a rotation of the mobile terminal 100, an acceleration or vibration applied to the mobile terminal 100), a geo-magnetic sensor to detect a point of the compass using the geomagnetic field, a gravity sensor to detect a direction of the gravity, and/or an altimeter to detect an altitude by measuring the atmospheric pressure. The at least one sensor detects a state of the mobile terminal 100, and generates a signal corresponding to the detection so as to transmit the generated signal to the controller 110. A sensor of the sensor module 170 may be added or removed depending on the performance of the mobile terminal 100.

The storage unit 175 may store a signal or data input/output to correspond to an operation of the mobile communication module 120, the sub-communication module 130, the multimedia module 140, the camera module 150, the GPS module 157, the input/output module 160, the sensor module 170, and the touch screen 190, based on the control of the controller 110. The storage unit 175 may store a control program and applications for controlling the mobile terminal 100 or the controller 110.

The storage unit 175 stores information about vibration intensity and a vibration period according to a haptic pattern for providing various haptic effects to the input unit 168 or the mobile terminal 100, when a temporary touch or successive touches are performed on the touch screen 190 using the input unit 168. There are a variety of haptic patterns for each pen type and for each material depending on a material of an object on which writing is to be performed using a pen. Examples of the pen applied to the present invention include a ballpoint pen, a pencil, a brush, a sign pen, a marker pen, and other various pens. The material represents a surface roughness of a material such as paper on which writing or drawing can be performed using the pen, and includes various materials such as paper, wood, cement, cloth, etc. In addition, the paper types of paper include old or worn paper of which a surface is slightly rough or wrinkled paper. The storage unit 175 stores a pattern for providing haptic data for each pen type and for each material, and such a pattern is read in response to a request from the controller 110. In addition, the storage unit 175 may select an arbitrary pen from a plurality of pens, store a handwriting condition application for selecting an arbitrary material from a plurality of materials, receive an input of selections of the pen and the material using the handwriting condition application, and synthesize haptic data of each of the selected pen and material.

The term "storage unit" may include the storage unit 175, the ROM 112 and the RAM 113 included in the controller 110, or a memory card (e.g., a Secure Digital (SD) card and a memory stick) mounted in the mobile terminal 100. The storage unit may include a non-volatile memory, a volatile memory, a Hard Disk Drive (HDD), or a Solid State Drive (SSD).

In addition, the storage unit 175 may store applications having various functions such as a navigation, a video call, a game, and a time-based alarm application, images to provide related Graphical User Interfaces (GUIs), user information, documents, databases or data associated with a touch input processing method, background images required for driving the mobile terminal 100 (a menu screen, an idle screen, etc.), operating programs, and images captured by the camera module 150. The storage unit 175 is a machine (for example, a computer)-readable medium, and the term "machine-readable medium" is defined as a medium that provides data to the machine so that the machine performs a specific function. The machine-readable medium may be a storage medium. The storage unit 175 may include a non-volatile medium and a volatile medium. The preceding media should correspond to a type in which instructions transmitted through the media are detected by a physical device that reads the instructions through the machine.

The machine-readable medium includes at least one of a floppy disk, a flexible disk, a hard disk, a magnetic tape, a Compact Disc Read-Only Memory (CD-ROM), an optical disk a punch card, a paper tape, a Random Access Memory (RAM), a Programmable ROM (PROM), an Erasable PROM (EPROM), and a flash-EPROM, but machine readable media according to embodiments of the present invention are not be limited thereto.

The power supply unit 180 supplies power to at least one battery disposed on the housing of the mobile terminal 100, based on the control of the controller 110. At least one battery provides power to the mobile terminal 100. The power supply unit 180 may supply, to the mobile terminal 100, power input from an external power source through the wired cable connected to the connector 165. The power supply unit 180 may supply, to the mobile terminal 100, power wirelessly input from the external power source through a wireless charging technology.

The mobile terminal 100 includes at least one touch screen 190 that may provide a user with user interfaces corresponding to various services (e.g., calling, data transmission, broadcasting, and image capturing). Each touch screen 190 may transmit, to a corresponding touch screen controller 195, an analog signal corresponding to at least one touch input on a user interface. As described above, the mobile terminal 100 may include a plurality of touch screens 190, and the touch screen controller 195 may receive an analog signal corresponding to a touch for each touch screen 190. The touch screens 190 may be respectively connected to a plurality of housings through a hinge connection, or a plurality of touch screens may be placed in a single housing without the hinge connection. The mobile terminal 100 according to the present invention, as described above, includes at least one touch screen 190, and hereinafter, a mobile terminal 100 with a single touch screen 190 will be described for ease of description.

The touch screen 190 receives an input of at least one touch through a body part of the user (e.g., a linger including a thumb) or a touchable input unit (e.g., a stylus pen and an electronic pen). For when an input is provided by a pen such as a stylus pen or an electronic pen, the touch screen 190 includes a pen recognition panel 191 to recognize the input, and the pen recognition panel 191 may recognize a distance between the pen and the touch screen 190 based on the magnetic field. The touch screen 190 may receive an input of successive motions of a single touch from among the at least one touch. The touch screen 190 may transmit, to the touch screen controller 195, an analog signal corresponding to the successive motions of the input touch.

Further, according to an embodiment of the present invention, the touch is not limited to a contact between the touch screen 190 and the body part of the user or the touchable input unit, and may include a non-contact (for example, a detectable distance between the touch screen 190 and the body part of the user or the touchable input unit without being in contact (for example, approximately 5 mm)). The detectable distance that is detected by the touch screen 190 may be changed based on the performance or configuration of the mobile terminal 100. The touch screen 190 is configured to output a different value by distinguishing a value detected by a touch event and a value detected by a hovering event (e.g., an analog value including a voltage value or a current value) so that a touch event occurring by a contact between the touch screen 190 and the body part of the user or the touchable input unit and a non-touch input (e.g., hovering) event may be distinguished from each other for detection. In addition, the touch screen 190 may output a different value by distinguishing a detected value (e.g., a current value, or the like) based on a distance between the touch screen 190 and a location on the touch screen 190 where a hovering event occurs.

The touch screen 190 may utilize various schemes for touch detection, such as a resistive, a capacitive, an infrared, or an ultrasonic wave schemes.

The touch screen 190 may include two or more touch screen panels, each being capable of sensing a touch or an approach by the body part of the user or the touchable input unit, so as to sequentially or simultaneously receive an input by the body part of the user and an input by the touchable input unit. The at least two touch screen panels may provide different output values to a touch screen controller, which recognizes the values input from the at least two touch screen panels as different values. Accordingly, the use of multiple touch screen panels may distinguish whether an input from the touch screen 190 corresponds to an input by the body part of the user or corresponds to an input by the touchable input unit.

More specifically, the touch screen 190 may be formed in a structure in which a panel that senses an input by a finger or the input unit 168 based on a change in an induced electromotive force and a panel that senses a contact between the touch screen 190 and a finger or the input unit 168 are sequentially laminated while being in a close contact with each other or partially spaced apart from each other. The touch screen 190 includes a plurality of pixels, and displays an image through the pixels. The touch screen 190 may use a Liquid Crystal Display (LCD), a Light Emitting Diodes (LED) display, or an Organic LED (OLED) display.

The touch screen 190 includes a plurality of sensors that recognize a location when a finger or the input unit 168 is in contact with a surface of the touch screen 190 or is placed at a distance from the touch screen 190. Each of the plurality of sensors is formed in a coil structure, and a sensor layer formed of a plurality of sensors, each having a pattern, may form a plurality of electrode lines. When a contact occurs on the touch screen 190 through a finger or the input unit 168 due to the above-described structure, a detection signal of which a waveform is modified based on a capacitance between the sensor layer and an input means is generated, and the touch screen 190 transmits the generated detection signal to the controller 110. A predetermined distance between the input unit 168 and the touch screen 190 may be recognized based on intensity of the magnetic field formed by a coil 430. The touch screen 190 displays a widget screen that displays at least one icon to correspond to a function for changing a size, a shape, and the like of the displayed icon. The widget screen allocates a display region to the at least one icon displayed on the touch screen and displays the at least one icon to which the display region is allocated. Here, the size of the display region is variable.

Meanwhile, the touch screen controller 195 converts an analog signal received from the touch screen 190 into a digital signal (for example, X and Y coordinates), and transmits the digital signal to the controller 110. The controller 110 may control the touch screen 190 using the digital signal received from the touch screen controller 195. For example, the controller 110 performs a control to select or to execute a shortcut icon or an object displayed on the touch screen 190, in response to a touch event or a hovering event. The touch screen controller 195 may be included in the controller 110.

Further, the touch screen controller 195 may detect a value such as a current value output through the touch screen 190, determine a distance between the touch screen 190 and a space where the hovering event occurs, convert a value of the determined distance into a digital signal (for example, a Z coordinate), and provide the digital signal to the controller 110.

Figure 2:
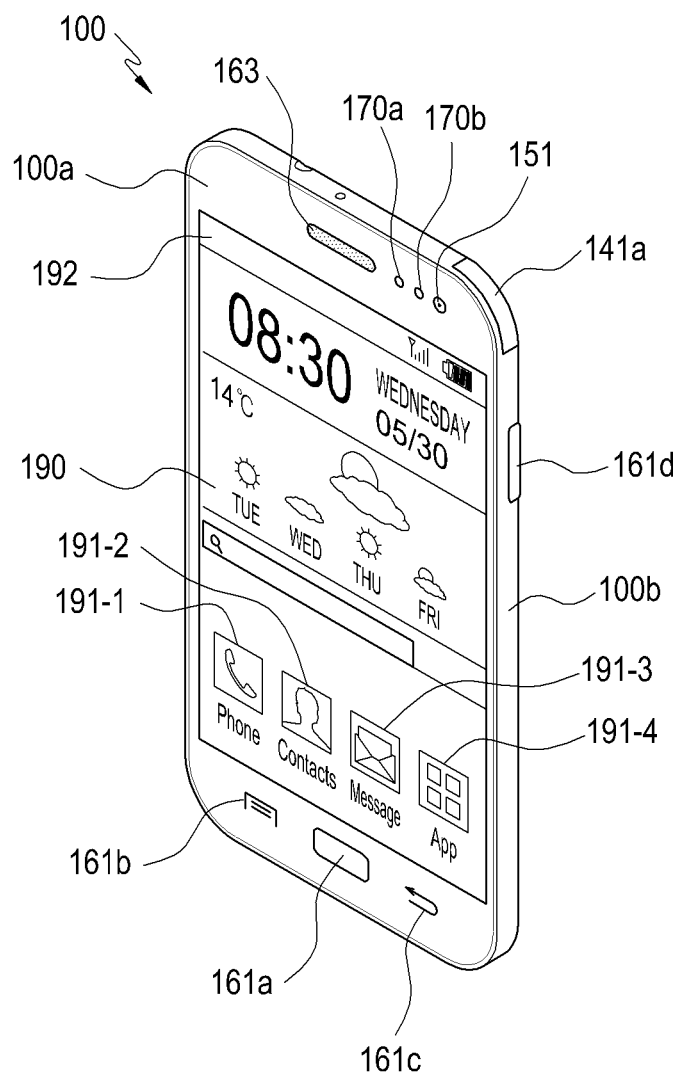
FIG. 2 is a front perspective diagram of a mobile terminal according to an embodiment of the present invention.
Figure 3:
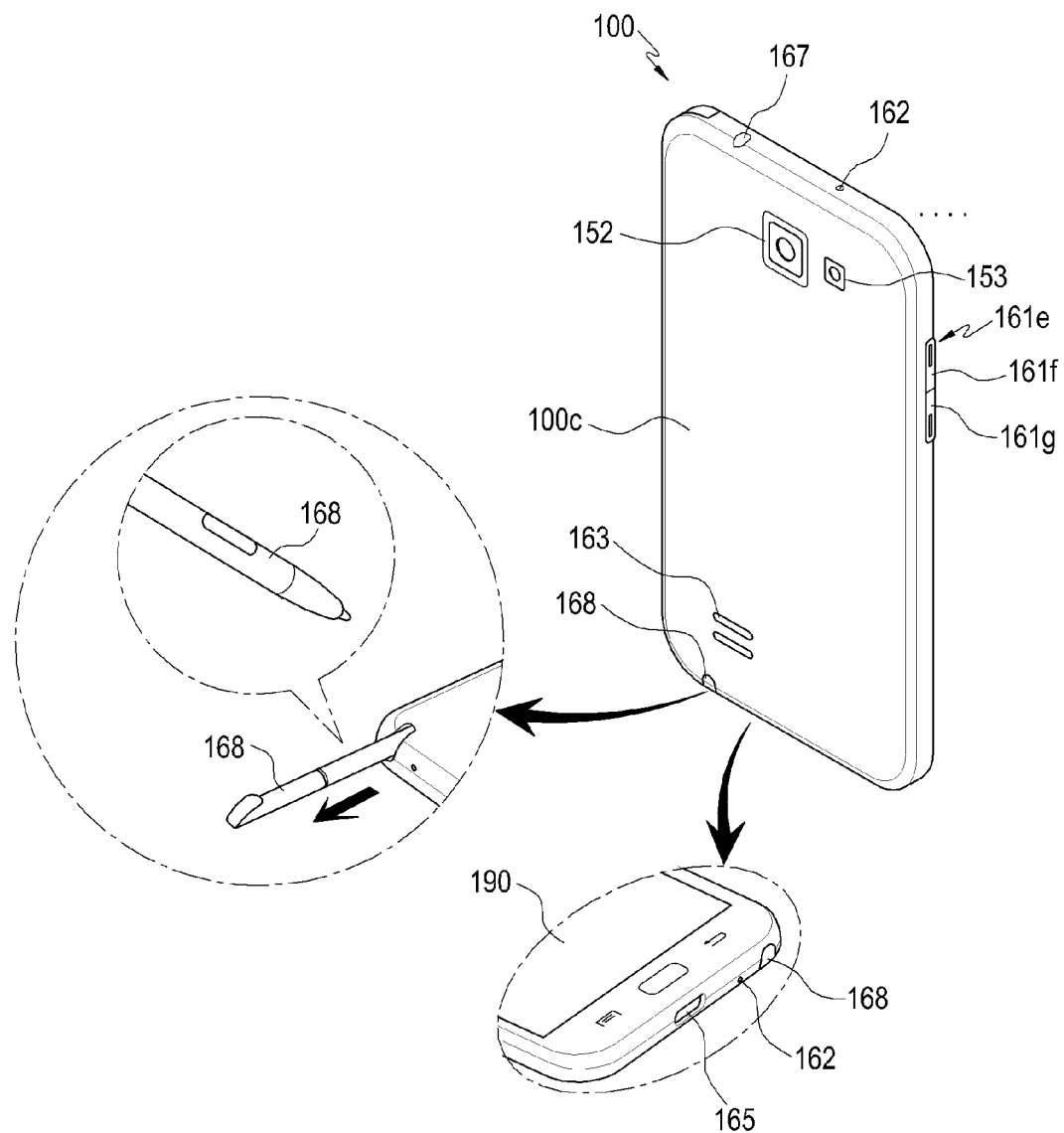
FIG. 3 is a rear perspective diagram of a mobile terminal according to an embodiment of the present invention.

FIG. 2 is a front perspective diagram of a mobile terminal according to an embodiment of the present invention, and FIG. 3 is a rear perspective diagram of a mobile terminal according to an embodiment of the present invention.

Referring to FIGS. 2 and 3, the touch screen 190 is disposed in the center of a front side 100*a* of the mobile terminal 100. The touch screen 190 may be formed to be large enough to occupy most of the front side 100*a* of the mobile terminal 100. FIG. 2 illustrates an example in which a main home screen is displayed on the touch screen 190. The main home screen is a first screen displayed on the touch screen 190 when the mobile terminal 100 is turned on. When the mobile terminal 100 has multiple pages of different home screens, the main home screen is the first home screen from among the multiple pages of home screens. In a home screen, shortcut icons 191-1, 191-2, and 191-3 for executing frequently used applications, a main menu switching key 191-4, the time, the weather, and the like are displayed. The main menu switching key 191-4 displays a menu screen on the touch screen 190. In addition, a status bar 192 displaying a status of the device 100, such as a battery charging status, an intensity of a received signal, and the current time, is formed on an upper end of the touch screen 190.

A home button 161*a*, a menu button 161*b*, and a back button 161*c* are formed in a lower portion of the touch screen 190.

The home button 161*a* enables a main home screen to be displayed on the touch screen 190. For example, when the home key 161*a* is touched while any home screen that is different from the main home screen or a menu screen is displayed on the touch screen 190, the main home screen may be displayed on the touch screen 190. When the home button 191*a* is touched while applications are executed on the touch screen 190, the main home screen illustrated in FIG. 2 may be displayed on the touch screen 190. The home button 161*a* enables recently used applications to be displayed on the touch screen 190 or may be used for displaying a task manager.

The menu button 161*b* provides a link menu that is used on the touch screen 190. The link menu may include a widget screen addition menu, a background change menu, a search menu, an edition menu, a configuration menu, an icon edition menu, and the like.

The back button 161*c* provides a screen that was executed immediately before a currently executed screen, or terminates the most recently used application.

The first camera 151, an illuminance sensor 170*a*, and a proximity sensor 170*b* are disposed on an edge of the front surface 100*a* of the mobile terminal 100. The second camera 152, the flash 153, and the speaker 163 are disposed on a back side 100*c* of the mobile terminal 100.

On a lateral surface 100*b* of the mobile terminal 100, for example, a power/reset button 161*d*, a volume button 161*f*, a terrestrial DMB antenna 141*a* for receiving broadcast, one or a plurality of microphones 162, and the like are disposed. The DMB antenna 141*a* may be fixed on the mobile terminal 100, or may be detachable.

The connector 165 is formed on a lateral side of a lower end of the mobile terminal 100. A plurality of electrodes is formed on the connector 165, and enables connection to an external device in a wired manner. The earphone connecting jack 167 is formed on a lateral side of an upper end of the mobile terminal 100. The earphones may be inserted into the earphone connecting jack 167.

In addition, the input unit 168 is formed on the lateral side of the lower end of the mobile terminal 100. The input unit 168 may be inserted into the mobile terminal 100 for storage, and may be taken out from and detached from the mobile terminal 100 when the input unit 168 is used.

Figure 4:
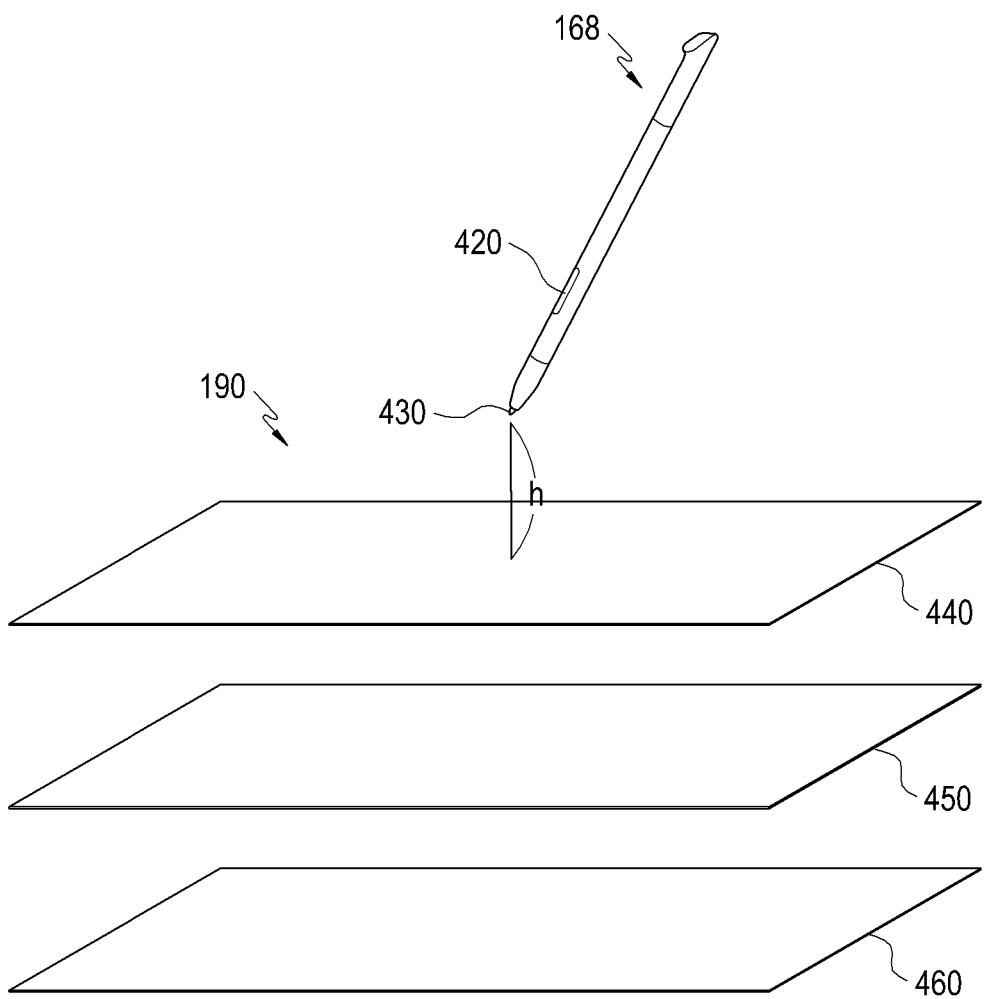
FIG. 4 is an internal cross-sectional diagram of an input unit and a touch screen according to an embodiment of the present invention.

FIG. 4 is an internal cross-sectional diagram of an input unit and a touch screen according to an embodiment of the present invention.

As shown in FIG. 4, the touch screen 190 includes a display panel 450, a first touch panel 440, and a second touch panel 460. The display panel 450 may correspond to an LCD panel or an Active-Matrix OLED (AMOLED) panel, and display various operation states of the mobile terminal 100, various images associated with execution of applications and services, and a plurality of objects.

The first touch panel 440 is a capacitive touch panel, and has two faces of a pane of glass that are coated with a thin metal conductive material (e.g., an Indium Tin Oxide (ITO) film) so that a current flows through a surface of the pane of glass, and is coated with a dielectric substance that is capable of storing an electric charge. When a surface of the first touch panel 440 is touched by an input unit (e.g., a finger of a user or a pen), a predetermined amount of electric charge moves to a location of the touch by static electricity, and the first touch panel 440 recognizes a variation in a current according to the movement of the electric charge and senses the location of the touch. The first touch panel 440 senses all touches that generate static electricity, and also senses a touch by a finger or a pen which corresponds to the input unit.

The second touch panel 460 is an Electronic Magnetic Resonance (EMR) touch panel, and includes an electromagnetic induction coil sensor having a grid structure in which a plurality of loop coils are respectively disposed in a predetermined first direction and in a second direction which intersects with the first direction, and an electronic signal processing unit that sequentially provides an Alternating Current (AC) signal having a predetermined frequency to each loop coil of the electromagnetic induction coil sensor. When the input unit 168 including a resonant circuit embedded therein exists around the loop coil of the second touch panel 460, a magnetic field transmitted from the corresponding loop coil generates a current in the resonant circuit of the input unit 168 based on mutual electromagnetic induction. Based on the current, an induction field is generated from a coil that forms the resonant circuit of the input unit 168, and the second touch panel 460 detects the induction field from the loop coil which is in a state of receiving a signal and senses a hovering location of the input unit 168, a touch location, and a height (h) (i.e., a distance) from the first touch panel 440 of the mobile terminal 100 to a pen point 430 of the input unit 168. The height from the first touch panel 440 of the touch screen 190 to the pen point 430 varies based on the performance or structure of the mobile terminal 100. In an input unit that is capable of generating an electromagnetic induction-based current, a hovering and a touch are sensed through the second touch panel 460. The second touch panel 460 is used for sensing a hovering or a touch by the input unit 168. The input unit 168 may be referred to as an electromagnetic pen or an EMR pen. In addition, the input unit 168 may be different from a general pen that excludes the resonant circuit sensed by the first touch panel 440. The input unit 168 includes a button 420 that is capable of changing an electromagnetic induction value generated by a coil disposed inside an area of a penholder which is adjacent to the pen point 430. The input unit 168 will be described in detail with reference to FIG. 5.

The touch screen controller 195 may include a first touch panel controller and a second touch panel controller. The first touch panel controller converts an analog signal received from the first touch panel 440 by sensing a touch by a hand or a pen, into a digital signal (for example, X, Y, and Z coordinates), and transmits the digital signal to the controller 110. The second touch panel controller converts an analog signal received from the second touch panel 460 by sensing a hovering or a touch by the input unit 168, into a digital signal, and transmits the digital signal to the controller 110. The controller 110 may control the display panel 450, the first touch panel 440, and the second touch panel 460 using digital signals received from the first and the second touch panel controllers. For example, the controller 110 enables a predetermined type of screen to be displayed on the display panel 450 in response to the hovering or the touch of the finger, the pen, or the input unit 168.

According to an embodiment of the present invention, the first touch panel may sense a touch by a finger of a user or a pen, and the second touch panel may sense a hovering or a touch by the input unit 168. Therefore, the controller 110 of the mobile terminal 100 may perform sensing by distinguishing the touch by the finger of the user or the pen and the hovering or the touch by the input unit 168. Although FIG. 4 merely illustrates a single touch screen, embodiments of the present invention are not limited to a single touch screen and may include a plurality of touch screens. The touch screens may be respectively included in housings and connected by a hinge, or the plurality of touch screens may be included in a single housing. Each of the plurality of touch screens is configured to include a display panel and at least one touch panel, as illustrated in FIG. 4.

Figure 5:
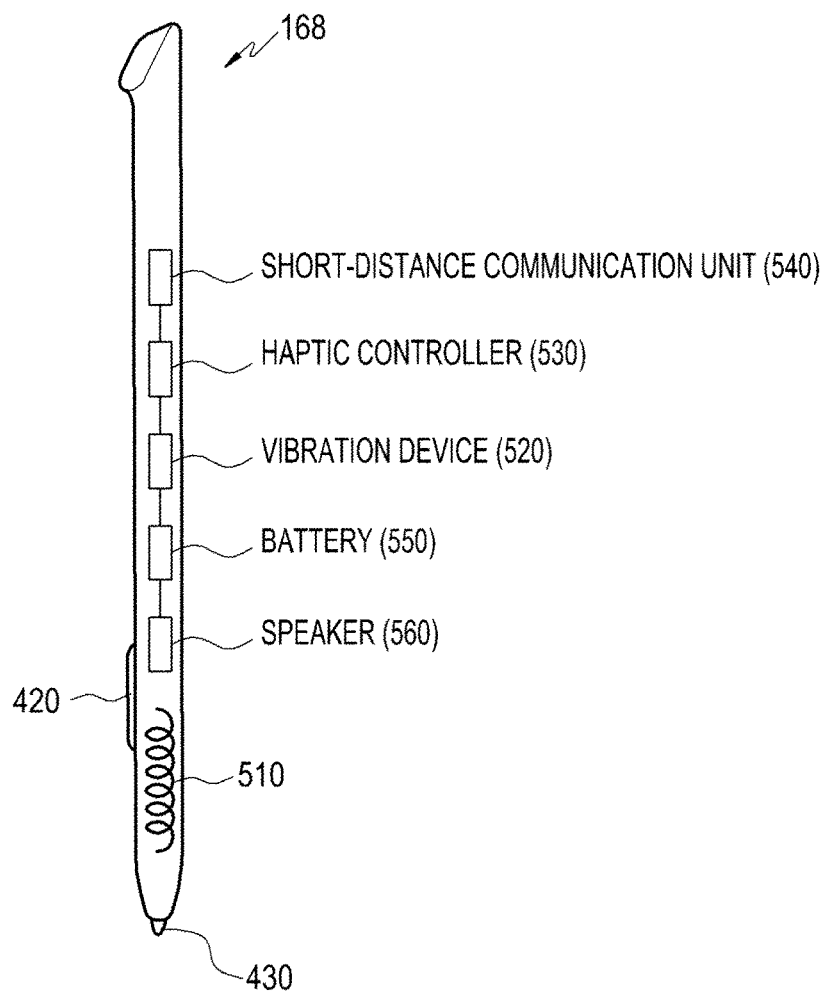
FIG. 5 is a block diagram illustrating an input unit that provides a haptic effect according to an embodiment of the present invention.

FIG. 5 is a block diagram illustrating an input unit that provides a haptic effect according to an embodiment of the present invention.

Referring to FIG. 5, an input unit (e.g., a touch pen) is configured to include a penholder, a pen point 430 disposed on an end of the penholder, a button 420 that is capable of changing an electromagnetic induction value generated by a coil 510 disposed inside an area of the penholder which is adjacent to the pen point 430, a vibration device 520 that vibrates when a hovering input effect occurs, a haptic controller 530 that analyzes a control signal received from the mobile terminal 100 through a hovering with the mobile terminal 100 and controls vibration intensity and a vibration period of the vibration device 520 to provide a haptic effect to the input unit 168, a short-distance communication unit 540 that performs short-distance communication with the mobile terminal 100, and a battery 550 that supplies power for vibration of the input unit 168. The input unit 168 further includes a speaker 560 that outputs a sound corresponding to a vibration period and/or vibration intensity of the input unit 168. The speaker 560 may output, a sound corresponding to the haptic effect provided to the speaker 163 included in the mobile terminal 100, a sound corresponding to the haptic effect provided to the input unit 168, simultaneously or a predetermined period of time (for example, 10 ms) before/after the provision of the haptic effect.

More specifically, the speaker 560 may output a sound corresponding to a variety of signals (for example, a wireless signal, a broadcasting signal, a digital audio file, and a digital moving picture file) from the mobile communication module 120, the sub-communication module 130, or the multimedia module 140 each included in the mobile terminal 100, based on a control of the controller 110. In addition, the speaker 560 may output a sound (e.g., a button manipulation sound corresponding to a phone call or a ring-back tone) corresponding to a function performed by the mobile terminal 100. One or more speakers 560 may be formed on an appropriate location or locations of the housing of the input unit 168.

When the pen point 430 has a contact with the touch screen 190 or is located within a distance (for example, 5 mm) in which a hovering is detectable, the haptic controller 530 analyzes at least one control signal received from the mobile terminal 100 through the short-distance communication unit 540, and controls a vibration period, vibration intensity, and the like of the vibration device 520 provided in the input unit 168. The short-distance communication unit 540 and the vibration device 520 have been activated before receiving the control signal. The control signal is a signal transmitted from the mobile terminal 100, and is periodically or non-periodically received from the mobile terminal 100 during a predetermined time or until a touch of a character or a picture using the input unit is finished. When the pen point 430 has a contact with the touch screen 190 to input a character or draw a picture, the mobile terminal 100 transmits, to the input unit 168, control signals respectively including a haptic pattern determined in advance in a pen and a haptic pattern determined in advance in a material, or transmits, to the short-distance communication unit 540 provided in the input unit 168, a control signal including a haptic pattern obtained by synthesizing the haptic pattern determined in advance in the pen and the haptic pattern determined in advance in the material.

The control signal is transmitted to the input unit 168 by at least one of the mobile communication module 120 and the sub-communication communication module 130 of the mobile terminal 100. The control signal includes at least one of information for activating the vibration device of the input unit 168, information indicating vibration intensity of the input unit 168, information for deactivating the vibration device of the input unit 168, and information indicating a total amount of time to provide a haptic effect. In addition, the control signal has a size of approximately 8 bits and is repeatedly transmitted every predetermined period (e.g., 5 ms) so that the vibration of the input unit 168 can be controlled, and therefore a user may recognize that the vibration according to the haptic effect is repeatedly performed at regular periods. For example, the control signal may include information shown in the following Table 1.

TABLE 1

| Field | Vibration device activation | Vibration intensity | Vibration device deactivation |
|---|---|---|---|
| Information | 1 | 125 125 131 131 0 | 2 |

As shown in Table 1, the control signal includes information for activating the vibration device 520 of the input unit, information indicating vibration intensity of the vibration device 520, and information for deactivating the vibration device 520. The control signal may be transmitted to the input unit 168 in a unit of 5 ms, but this is merely an example, and transmission of the control signal may be variable depending on a cycle of the haptic pattern. A transmission period, vibration intensity, and a transmission time are also variable. The transmission period, the vibration intensity, and the transmission time are different depending on a pen type and/or a material type. The transmission time may be a time when a temporary touch or successive touches are finished on the touch screen 190 using the input unit 168.

The input unit 168 as described above is configured to support an electrostatic inductive scheme. The touch screen 190 is configured to detect a location of the corresponding magnetic field and to recognize a touch point when the magnetic field is formed at a point of the touch screen 190 by the coil 510.

Figure 6:
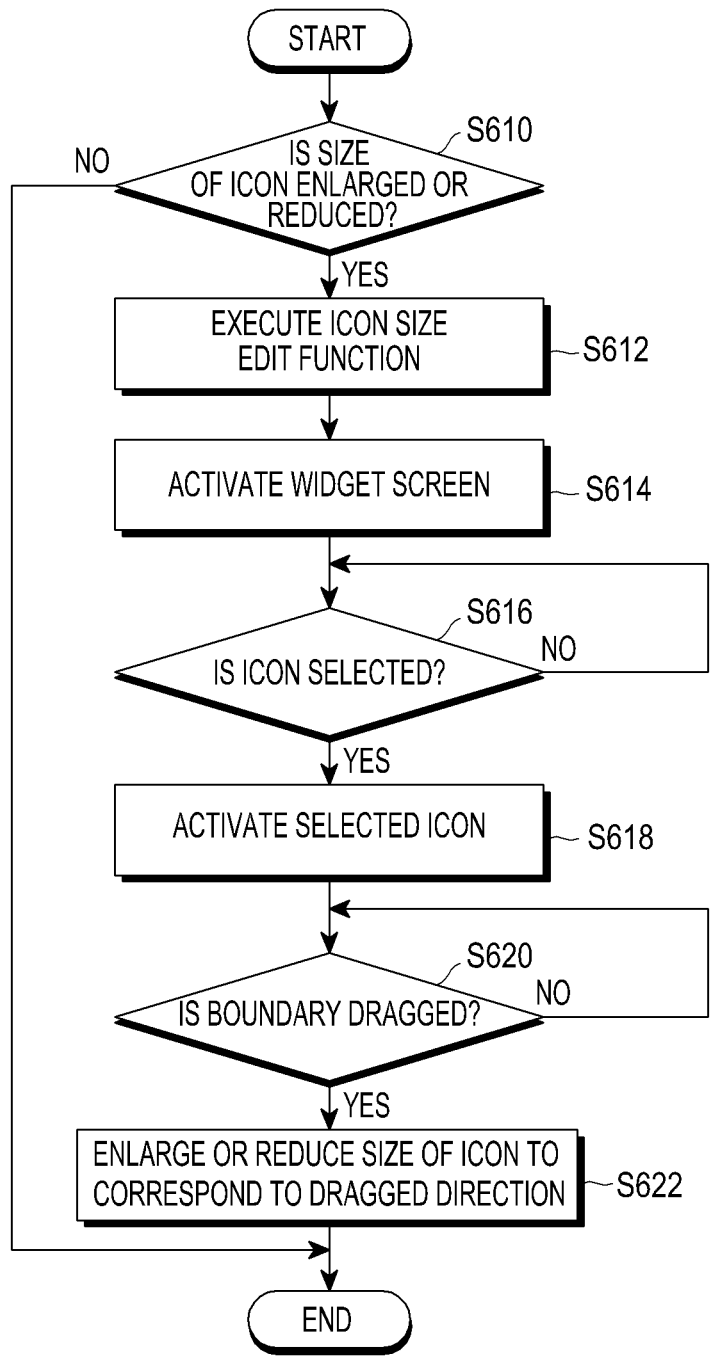
FIG. 6 is a flowchart illustrating a process of adjusting a size of an icon of a mobile terminal according to an embodiment of the present invention.

FIG. 6 is a flowchart illustrating a process of adjusting a size of an icon of a mobile terminal according to an embodiment of the present invention, and FIGS. 7A-7L are diagrams illustrating a process of enlarging or reducing a size of an icon of a mobile terminal according to an embodiment of the present invention.

Figure 7A:
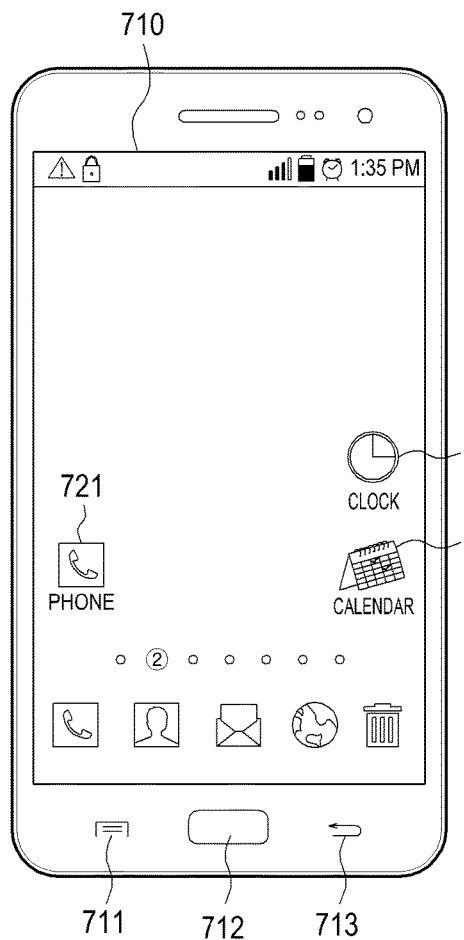
FIG. 7A is a diagram illustrating an example of displaying at least one icon on a touch screen of a mobile terminal according to an embodiment of the present invention.
Figure 7B:
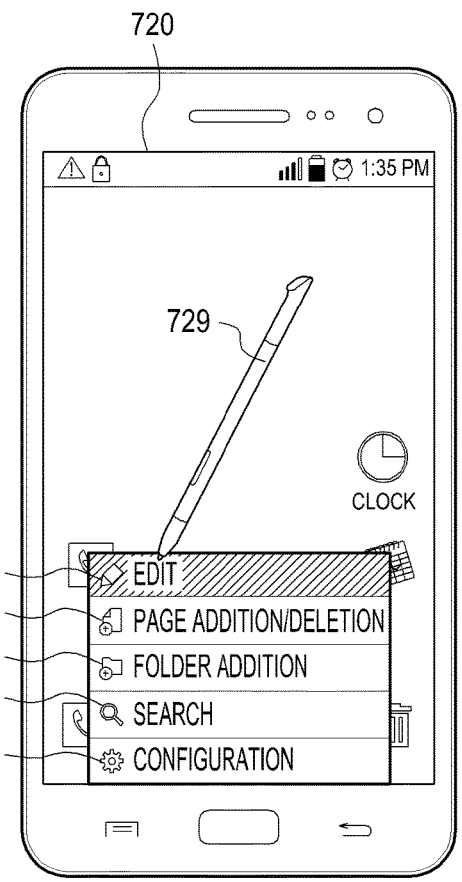
FIG. 7B is a diagram illustrating a result obtained by executing a menu for controlling an icon displayed on a touch screen according to an embodiment of the present invention.
Figures 7C, 7D:
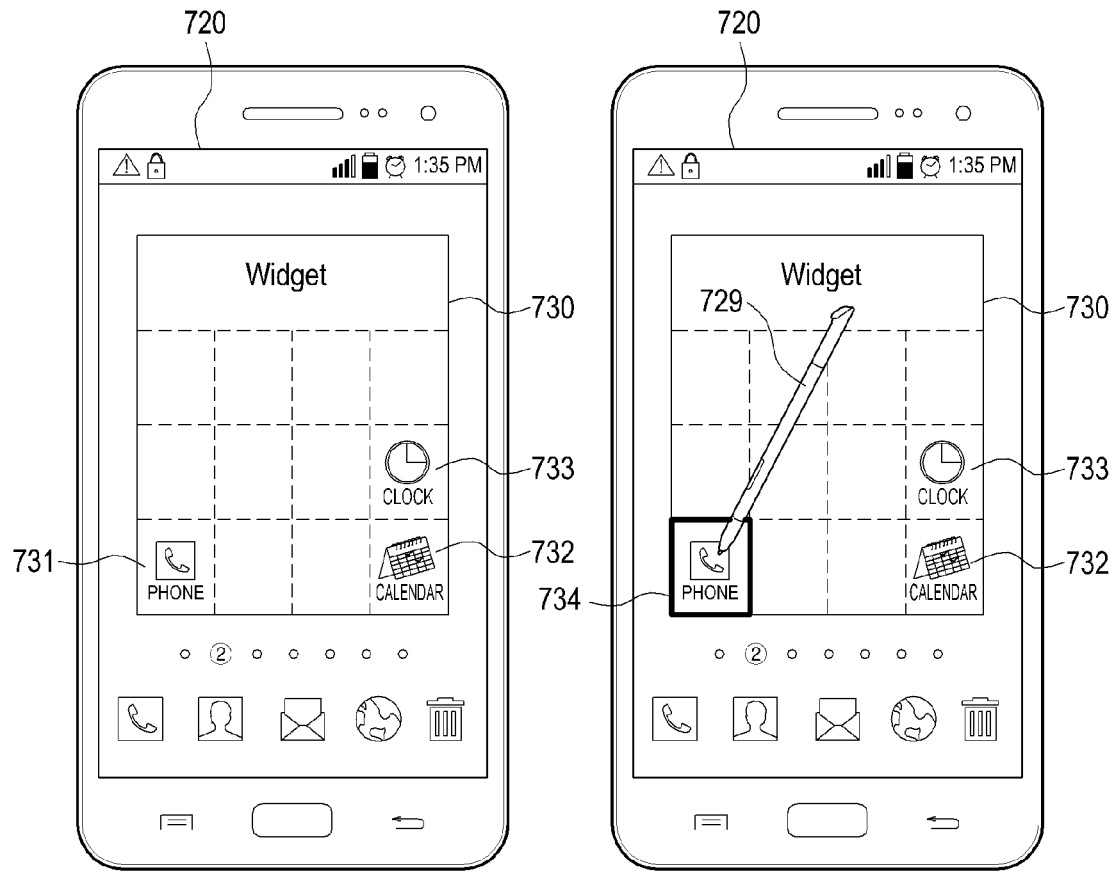
FIG. 7C is a diagram illustrating an example of displaying a widget screen when selecting an icon editing menu according to an embodiment of the present invention.
FIG. 7D is a diagram illustrating an example of selecting an icon displayed on a widget screen according to an embodiment of the present invention.
Figures 7E, 7F:
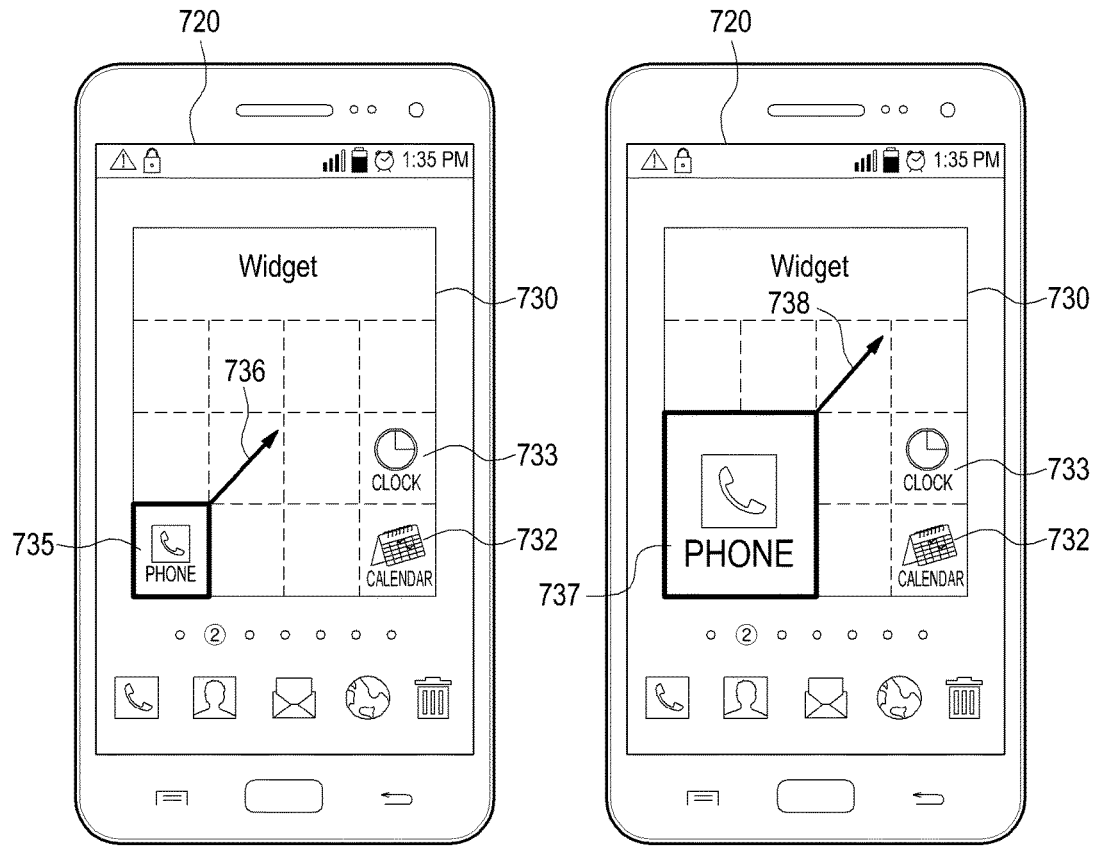
FIG. 7E is a diagram illustrating an example of enlarging a size of an icon on a widget screen according to an embodiment of the present invention.
FIG. 7F is a diagram illustrating an example of magnifying an icon on a widget screen according to an embodiment of the present invention.
Figures 7G, 7H:
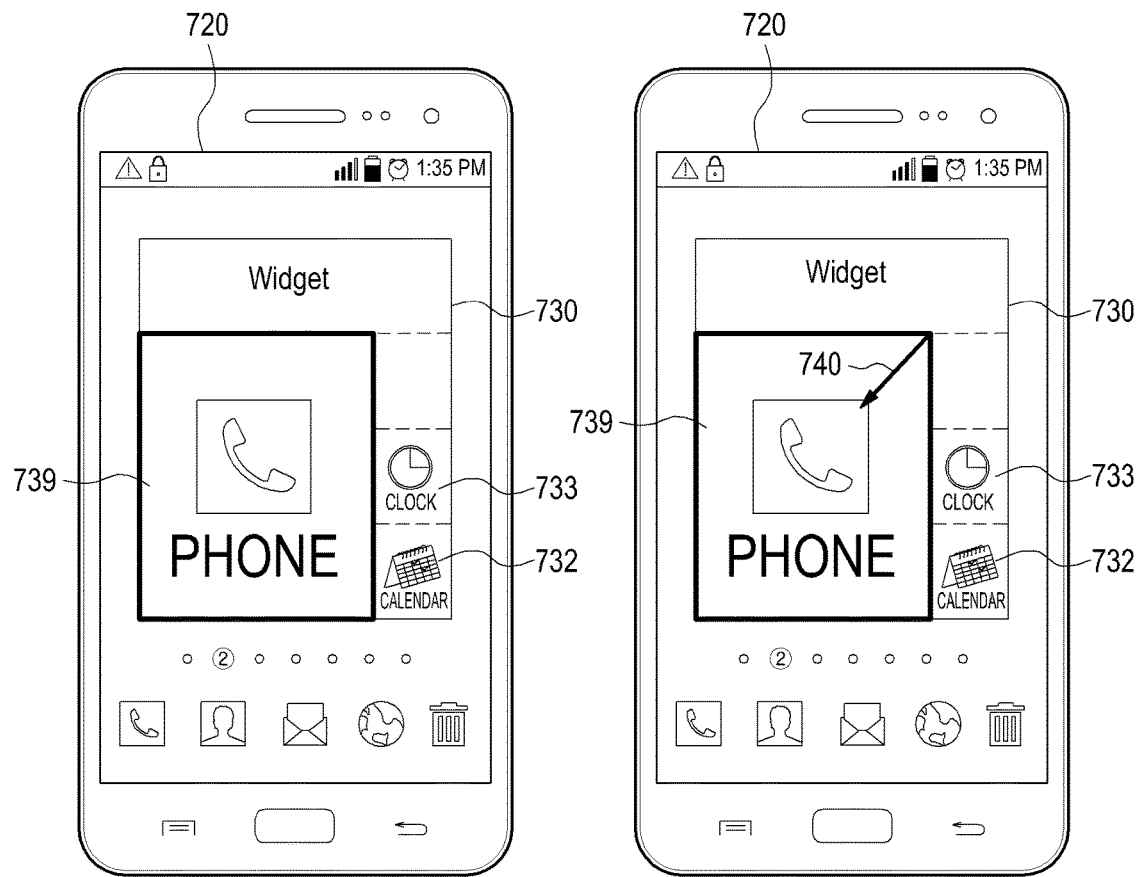
FIG. 7G is a diagram illustrating an example of maximally magnifying an icon on a widget screen according to an embodiment of the present invention.
FIG. 7H is a diagram illustrating an example of reducing a size of an icon on a widget screen according to an embodiment of the present invention.
Figures 7I, 7J:
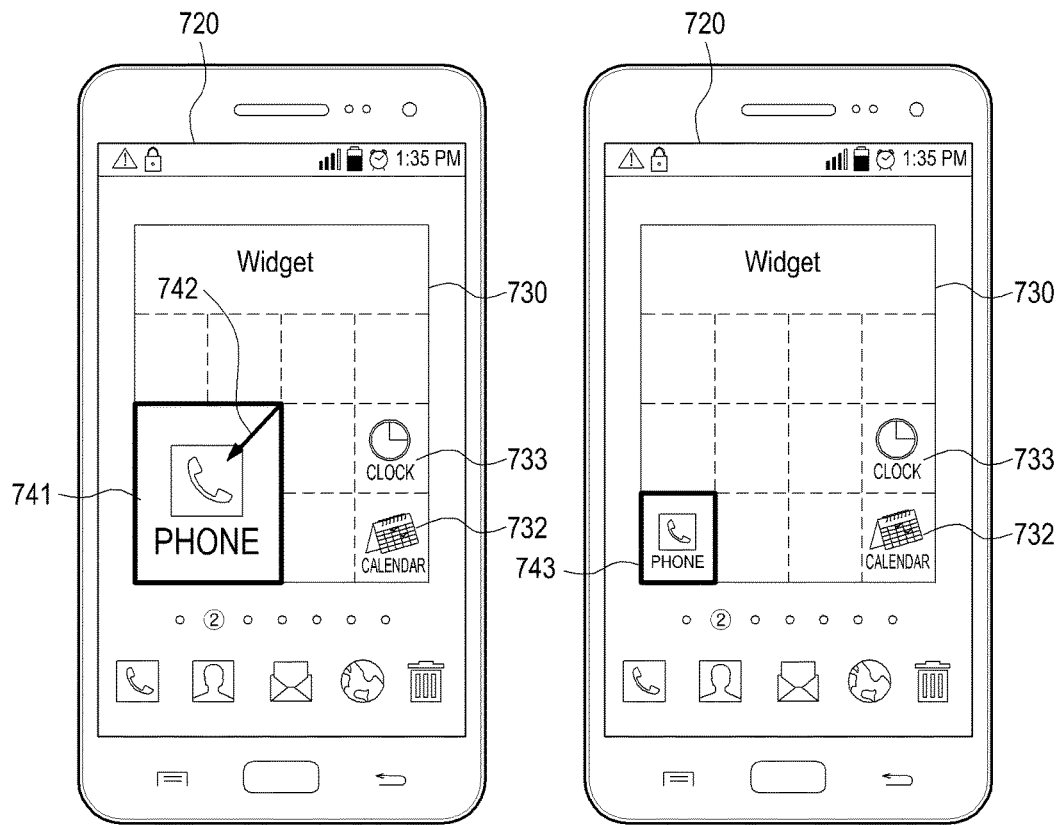
FIG. 7I is a diagram illustrating an example of reducing an icon on a widget screen according to an embodiment of the present invention.
FIG. 7J is a diagram illustrating another example of reducing an icon on a widget screen according to an embodiment of the present invention.
Figures 7K, 7L:
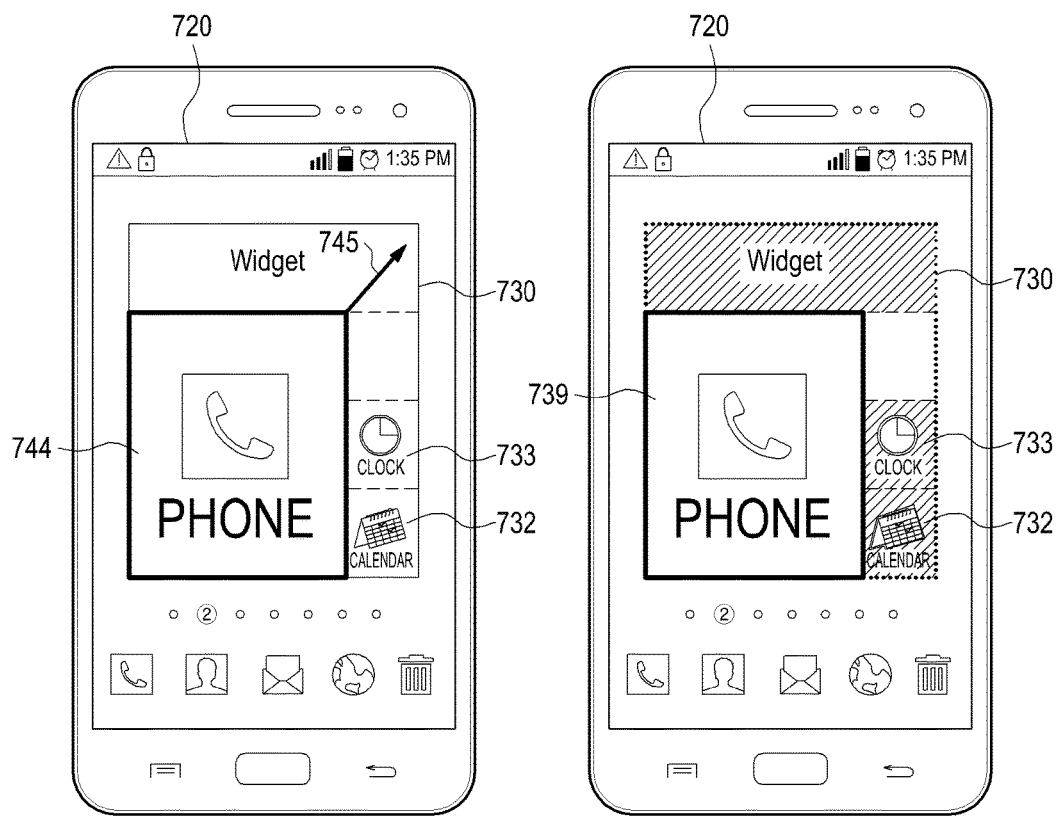
FIG. 7K is a diagram illustrating an example of further magnifying a maximally magnified icon on a widget screen according to an embodiment of the present invention.
FIG. 7L is a diagram illustrating a case in which an icon on a widget screen is no longer magnified according to an embodiment of the present invention.

FIG. 7A is a diagram illustrating an example of displaying at least one icon on a touch screen of a mobile terminal according to an embodiment of the present invention, FIG. 7B is a diagram illustrating a result obtained by executing a menu for controlling an icon displayed on a touch screen according to an embodiment of the present invention, FIG. 7C is a diagram illustrating an example of displaying a widget screen when selecting an icon edition menu according to an embodiment of the present invention, FIG. 7D is a diagram illustrating an example of selecting an icon displayed on a widget screen according to an embodiment of the present invention, FIG. 7E is a diagram illustrating an example of enlarging a size of an icon on a widget screen according to an embodiment of the present invention, FIG. 7F is a diagram illustrating an example of magnifying an icon on a widget screen according to an embodiment of the present invention, FIG. 7G is a diagram illustrating an example of maximally magnifying an icon on a widget screen according to an embodiment of the present invention, FIG. 7H is a diagram illustrating an example of reducing a size of an icon on a widget screen according to an embodiment of the present invention, FIG. 7I is a diagram illustrating an example of reducing an icon on a widget screen according to an embodiment of the present invention, FIG. 7J is a diagram illustrating another example of reducing an icon on a widget screen according to an embodiment of the present invention, FIG. 7K is a diagram illustrating an example of further magnifying a maximally magnified icon on a widget screen according to an embodiment of the present invention, FIG. 7L is a diagram illustrating an example in which an icon on a widget screen is no longer magnified according to an embodiment of the present invention.

Hereinafter, a process of adjusting the size of an icon of a mobile terminal according to an embodiment of the present invention will be described in detail with reference to FIGS. 6 and 7A-7L.

In steps S610 and S612, when a user desires to enlarge or reduce the size of an icon, an icon size editing function is executed. The icon size editing function may be executed through a menu button or a configuration menu of the mobile terminal. The menu button may include various menus such as a widget screen addition menu, a background change menu, a search menu, an editing menu, a configuration menu, and the like, in addition to the icon editing menu that edits the size of the icon.

Referring to FIG. 7A, a mobile terminal according to an embodiment of the present invention displays icons 721, 722, and 723 on the touch screen 710. These icons may include a phone icon 721, a calendar icon 722, and a clock icon 723. A home button 712, a menu button 711, and a back button 713 are formed on a lower portion of the mobile terminal. The home button 712 is located at the center of the lower portion of the mobile terminal and displays a main home screen on the touch screen 190. The menu button 711 includes various menus such as a widget screen addition menu, a background change menu, a search menu, an editing menu, a configuration menu, and the like, in addition to the icon editing menu that edits the size of the icon. The back button 713 may be selected to display a screen that is executed immediately before a currently executed screen, or to terminate the most recently used application.

Referring to FIG. 7B, when the menu button 711 is executed, a pop-up window is displayed. The pop-up window includes functions such as edit 724, page addition/deletion 725, folder addition 726, search 727, and configuration 728. The pop-up window may display other functions depending on the type of the mobile terminal. In step S610, when the user desires to enlarge or reduce the size of the icon, the user touches the edit function 724 among the functions included in the displayed pop-up window, using the input unit 729.

In step S614, when the function of editing the size of the icon is executed in step S612, the mobile terminal activates a widget screen on the touch screen. Activation of the widget screen corresponds to displaying at least one icon on the widget screen to correspond to the function for changing the size of the icon on the touch screen that displays the at least one icon. The widget screen allocates a display region to the at least one icon displayed on the touch screen, and displays the at least one icon to which the display region is allocated. Here, a size of the display region may be adjustable, and variable.

Referring to FIG. 7C, the widget screen 730 is displayed on the touch screen 720 of the mobile terminal, and the displayed widget screen 730 displays a phone icon 731, a calendar icon 732, and a clock icon 733. The widget screen 730 may be displayed overlapped with the touch screen 720, or displayed separately. The phone icon 731, the calendar icon 732, and the clock icon 733 are icons displayed on an initial touch screen. In addition, according to an embodiment of the present invention, it is possible to display the icons displayed on the initial touch screen, or display an icon whose size is to be adjusted in response to a user's request. In FIG. 7C, when the icon (for example, the phone icon 734 of FIG. 7D) whose size is to be adjusted is selected using the input unit 729 or a user's finger, the selected icon is activated.

In step S618, when the icon is selected, the icon selected to correspond to the selection of the icon is activated. As illustrated in FIG. 7C, when an arbitrary icon (e.g., the phone icon) is selected while at least one icon such as the phone icon 731, the calendar icon 732, and the clock icon 733 is displayed on the displayed widget screen 730, the selected phone icon 731 of FIG. 7C is activated to the phone icon 734 of FIG. 7D. The activation corresponds to displaying the selection of the icon to a user. That is, the activation is used for changing an attribute of the selected icon to correspond to the selection of the icon to which the selected function is to be applied, and as illustrated in FIG. 7D, a boundary 734 with a bold line is formed on an outer periphery of the phone icon 734 to notify a user that the size of the selected icon can be changed. Through this, the user may recognize that the selected icon is activated. In addition, activation, according to an embodiment of the present invention, includes a variety of methods in which a user can recognize the change in the size of the selected icon, in addition to the boundary 734.

In steps S620 and 622, when the boundary of the activated icon is dragged, the mobile terminal enlarges or reduces the size of the icon to correspond to the dragged direction. More specifically, the mobile terminal adjusts the size of the selected icon through a dragging operation to correspond to a direction of dragging one side of the selected icon on the widget screen. This adjustment corresponds to touching the one side of the selected icon and then enlarging or reducing the size of the selected icon to correspond to a distance in a vertical and horizontal advancing direction. In the present example, the enlargement of the icon is performed up to the size of the icon that is not overlapped with the icon adjacent to the selected icon. In addition, the adjustment is performed in a process of calculating a distance between a first point at which the icon on the widget screen is touched and a second point at which the dragging operation is completed, determining a direction from the first point to the second point, and adjusting the size of the selected icon in the same direction as the direction by the calculated distance. The size of the selected icon is adjusted in real-time to correspond to the dragging operation. Hereinafter, a process of magnifying or reducing an icon will be described with reference to FIGS. 7E to 7L.

FIG. 7E is a diagram illustrating an example of enlarging a size of an icon on a widget screen according to an embodiment of the present invention. Referring to FIG. 7E, a plurality of icons are displayed on a widget screen 730 displayed on a touch screen 720. When a user desires to enlarge a size of the icon among the displayed plurality of icons, the user selects the corresponding icon (e.g., a phone icon 735), and drags the selected icon in one direction 736. The dragging may be performed in any direction vertically and horizontally. In addition, the dragging may differ depending on a location in which the icon whose size is to be enlarged is placed on the widget screen. For example, when the corresponding icon is located on an upper end of the widget screen, the dragging is performed in the downward direction, and when the corresponding icon is located on a lower end thereof, the dragging is performed in the upward direction. In addition, as illustrated in FIG. 7E, when the corresponding icon is located on a lateral lower end of the widget screen, the dragging may be performed in the up direction or right direction. In addition, the dragging may be performed in an intermediate direction between the up and right directions. FIG. 7E illustrates an example in which dragging is performed in the intermediate direction between the up and right directions. FIG. 7F illustrates an example in which an icon on the widget screen is magnified. As illustrated in FIG. 7E, the phone icon 735 selected in FIG. 7E is magnified to an icon 737 of FIG. 7F to correspond to the dragging direction 736. In this manner, the magnification (magnification from the phone icon 735 of FIG. 7E to the phone icon 737 of FIG. 7F) of the selected icon may be performed in a unit of a single cell (i.e., an area occupied by a single icon in FIG. 7E) constituting the widget screen. However, according to an embodiment of the present invention, the size of the icon may be enlarged or reduced in units of cells, and also enlarged or reduced in units of pixels. A single cell is constituted of a plurality of pixels. When the icon 737 enlarged to a predetermined size in FIG. 7F is displayed and then dragging 738 is performed again in the same direction as the dragging direction of FIG. 7e, the icon is further magnified. That is, the phone icon 737 magnified in FIG. 7F is further magnified to a phone icon 739 of FIG. 7G to correspond to the corresponding dragging. In this manner, the magnification of the icon may be performed up to the size corresponding to the widget screen 730 as a maximum. However, when other icons 732 and 733 are present on the widget screen 730, the selected icon may be affected by the other icons 732 and 733. For example, the phone icon 739 of FIG. 7G cannot be enlarged all the way up to the size of the widget screen 730. As described above, when a dragging operation occurs in a state in which the corresponding icon is magnified to a maximum will be described with reference to FIGS. 7K and 7L. According to an embodiment of the present invention, reduction of the icon is possible as well as magnifying of the icon. Referring to FIG. 7H, the phone icon (see, 739 of FIG. 7H) magnified by the dragging 738 of FIG. 7F is reduced by dragging 740 to reduce the size of the corresponding icon. As illustrated in FIG. 7H, the phone icon 739 enlarged on the widget screen 730 that displays the calendar icon 732 and the clock icon 733 is reduced by the dragging 740. FIG. 7I illustrates an example in which an icon on a widget screen is reduced, and the corresponding icon is reduced by the dragging 740 of FIG. 7H, as shown in a phone icon 741 of FIG. 7I. The reduction of the icon may be performed in units of cells on the widget screen. The corresponding icon is further reduced by dragging 742 of FIG. 7I. That is, when the dragging 742 of FIG. 7I is input, the corresponding icon is reduced, from the phone icon 741 of FIG. 7i to a phone icon 743 of FIG. 7J, as shown in FIG. 7J.

FIG. 7K illustrates an example in which a maximally magnified icon on a widget screen is further magnified according to an embodiment of the present invention. In FIG. 7K, the phone icon 744 is further magnified through dragging in a state in which the maximally magnified phone icon 739 is displayed as illustrated in FIG. 7g. That is, as illustrated in FIG. 7k, the widget 730 displays the calendar icon 732, the clock icon 733, and the magnified phone icon 744. The magnified phone icon 744 is no longer magnified by the dragging 745, because the magnified phone icon 744 is affected by other icons (the calendar icon 732 and the clock icon 733). More specifically, widget screen 730 includes a plurality of cells, and a single icon that is no longer magnified is allocated for each cell. On the widget screen 730, the magnification of icon may be performed in a unit of cells, in which an adjacent icon adjacent to the corresponding icon does not exist, to correspond to the corresponding dragging direction. More specifically, when an adjacent icon exists, the magnification of the icon is performed so as to prevent the corresponding icon and the adjacent icon from overlapping each other. For example, the phone icon 744 magnified in FIG. 7K is magnified to the extent that it is not overlapped with the calendar icon 732 and the clock icon 733. When the corresponding icon is magnified by the dragging 745 in this state, some cells (i.e., cells 730, 732, and 733) such as cells 732 and 733 formed by other icons and a widget cell 730 may be displayed as a shaded area. FIG. 7L illustrates an example in which an icon on a widget screen is no longer magnified according to an embodiment of the present invention. The display of the shaded area of FIG. 7L is merely provided as an example, and embodiments of the present invention are not limited thereto. More specifically, according to an embodiment of the present invention, a bounce effect may be provided to one side of the phone icon 744 in FIG. 7K, so that a user may recognize that the corresponding icon is no longer magnified.

Figure 8A:
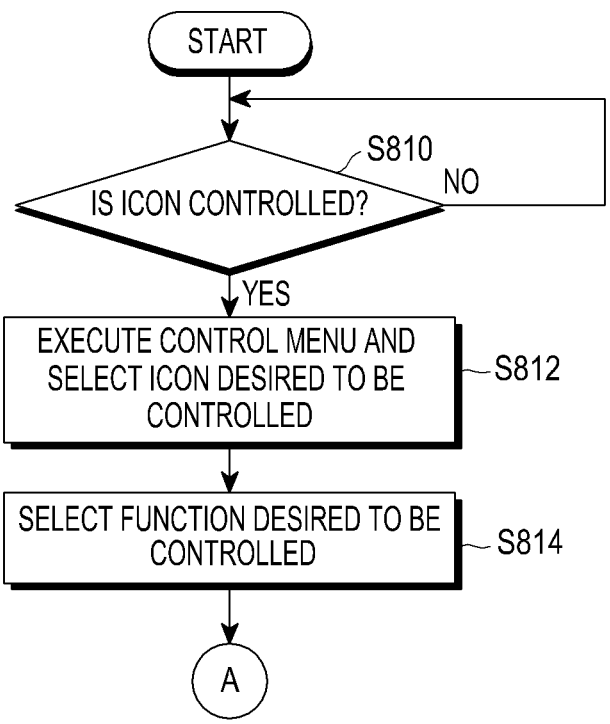
FIG. 8 is a flowchart illustrating a process of controlling an attribute of an icon according to an embodiment of the present invention.
Figure 8B:
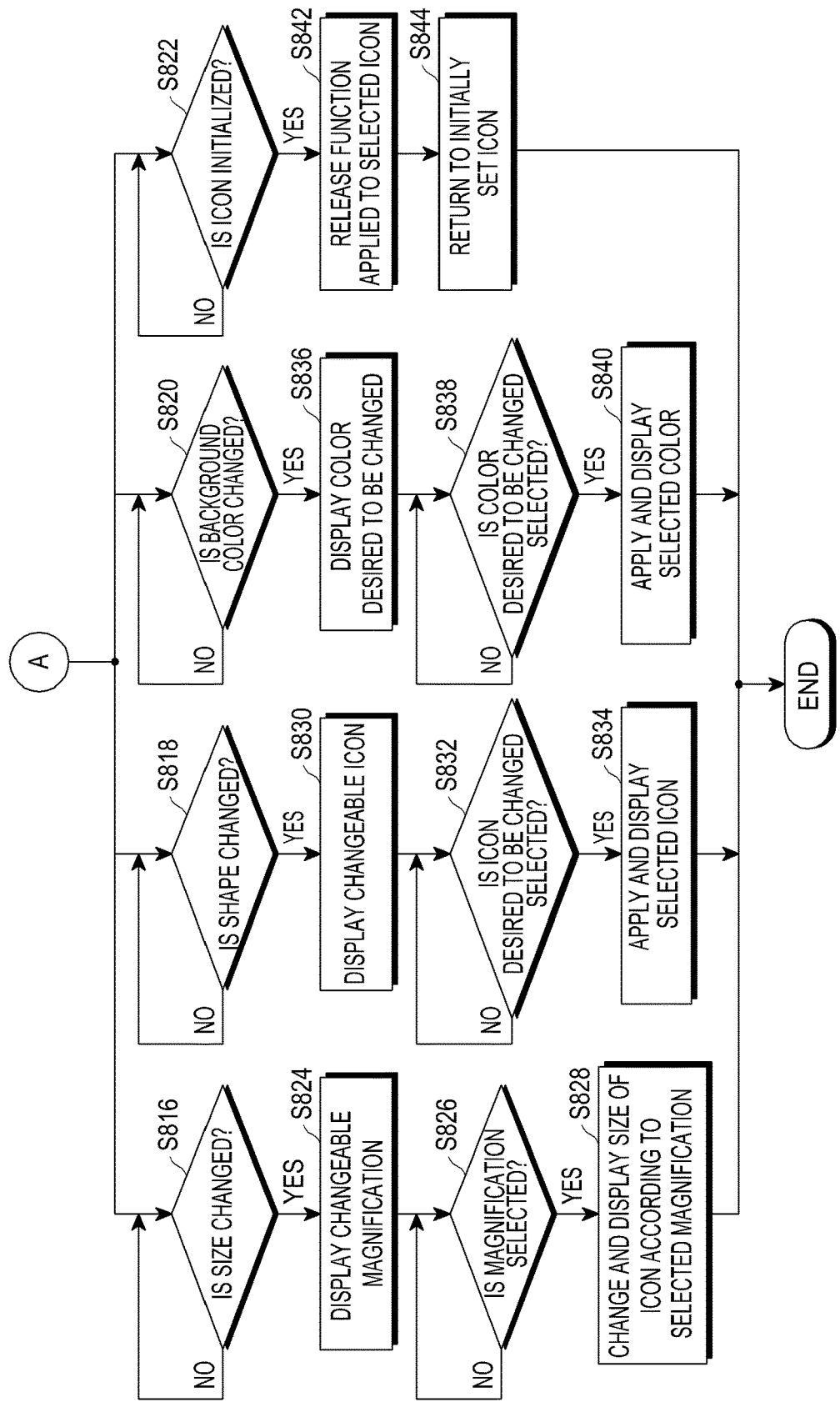
Figure 9A:
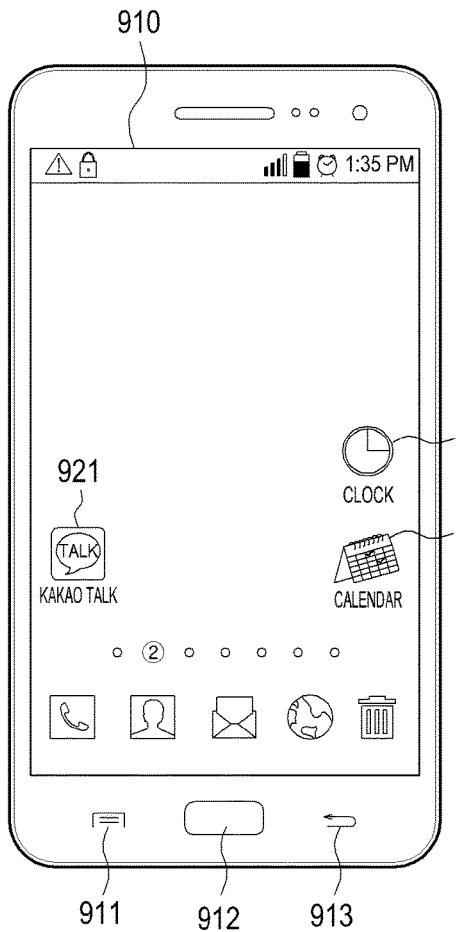
FIG. 9A is a diagram illustrating an example of displaying at least one icon on a touch screen of a mobile terminal according to an embodiment of the present invention.
Figure 9B:
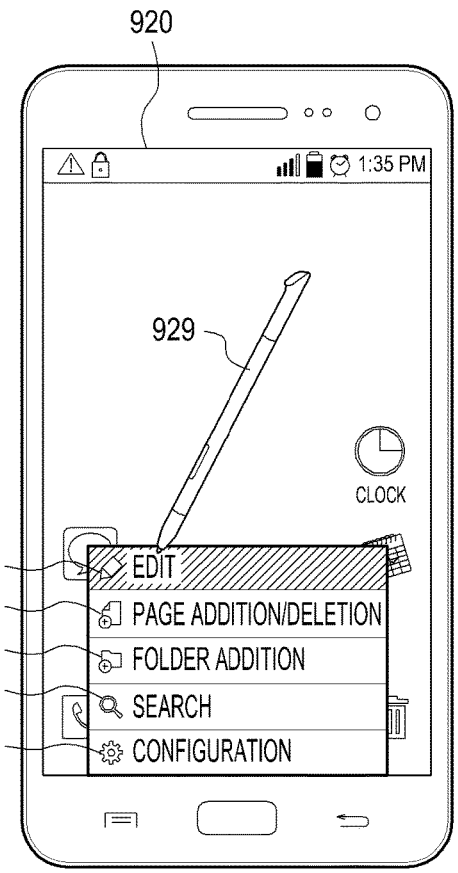
FIG. 9B is a diagram illustrating a result obtained by executing a menu for controlling an attribute of an icon displayed on a touch screen according to an embodiment of the present invention.
Figures 9C, 9D:
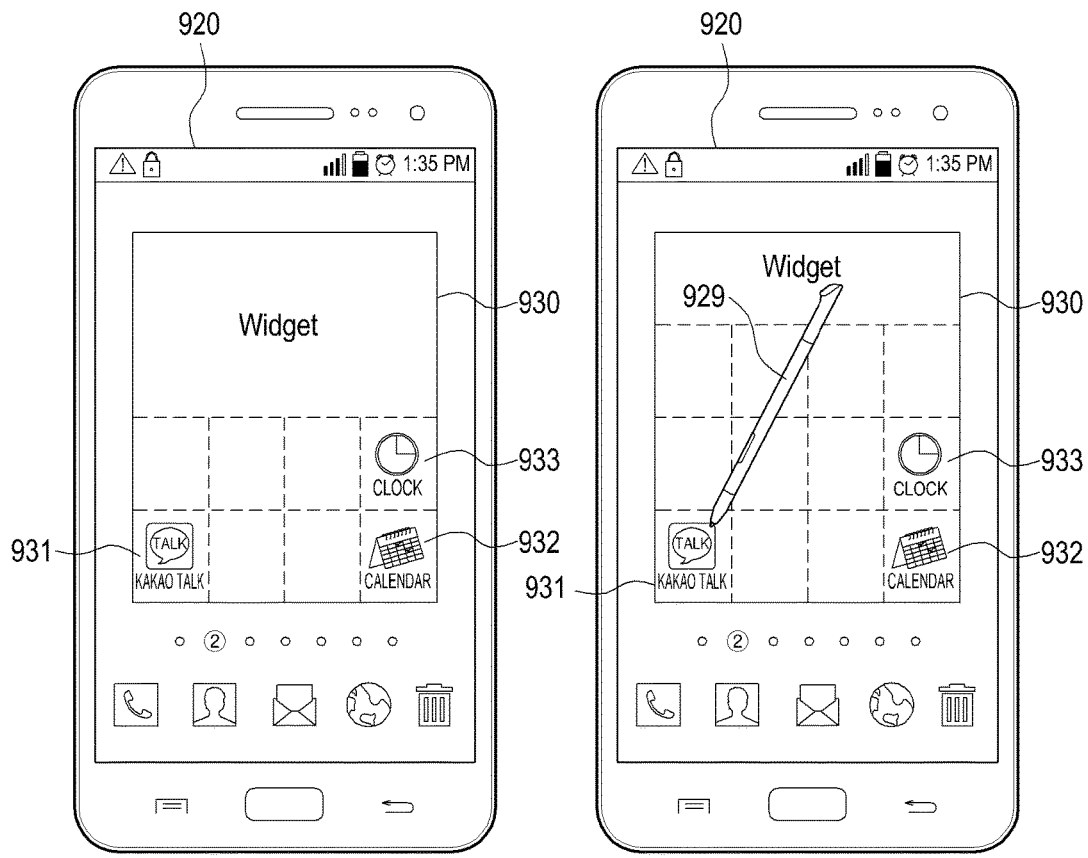
FIG. 9C is a diagram illustrating an example of displaying a widget screen when selecting an icon editing menu according to an embodiment of the present invention.
FIG. 9D is a diagram illustrating an example of selecting an icon displayed on a widget screen according to an embodiment of the present invention.
Figure 9G:
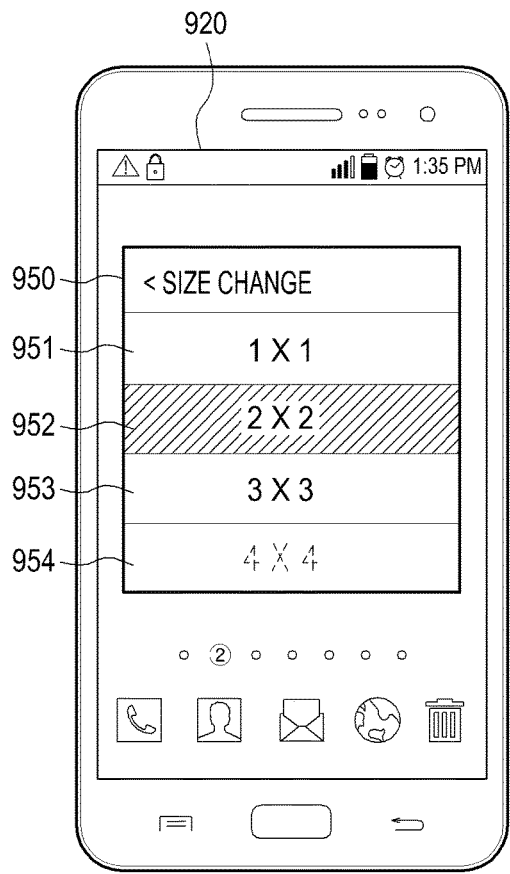
FIG. 9G is a diagram illustrating an example of displaying a magnification applied to a size change of an icon according to an embodiment of the present invention.
Figure 9H:
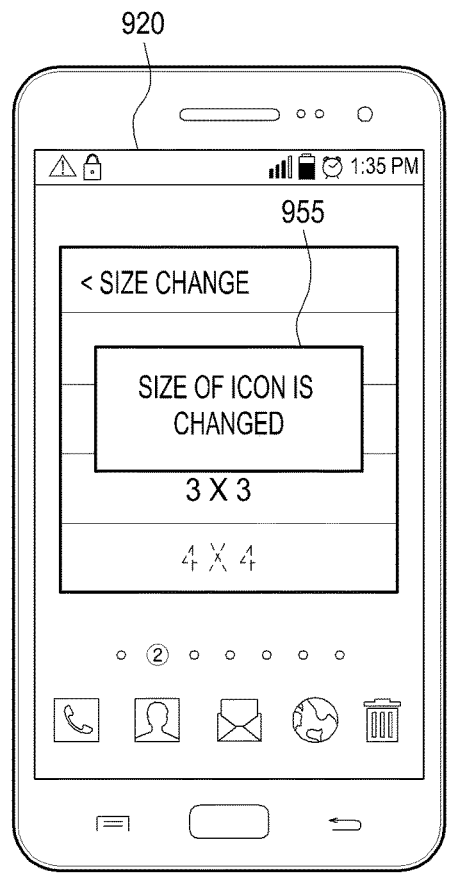
FIG. 9H is a diagram illustrating an example of displaying a pop-up window for informing an application result when applying a magnification to an icon according to an embodiment of the present invention.
Figures 9I, 9J:
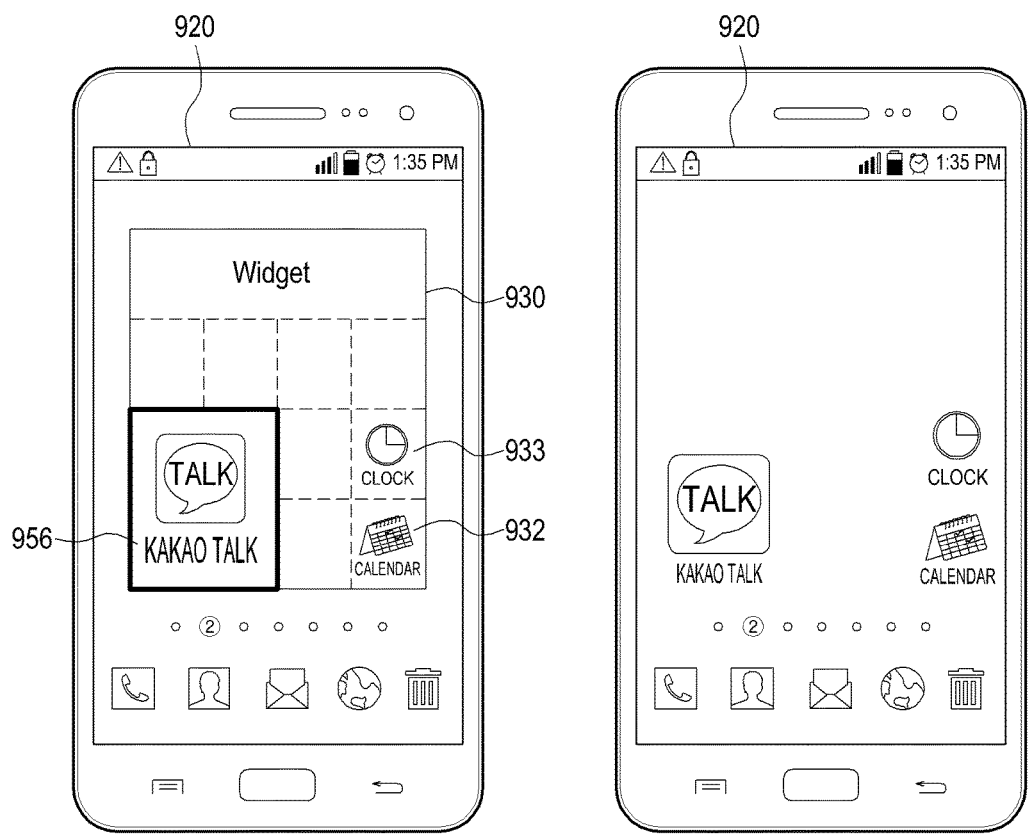
FIG. 9I is a diagram illustrating a result obtained by applying a magnification to an icon according to an embodiment of the present invention.
FIG. 9J is a diagram illustrating a result obtained by displaying an icon to which a magnification is applied, on a touch screen according to an embodiment of the present invention.
Figure 9K:
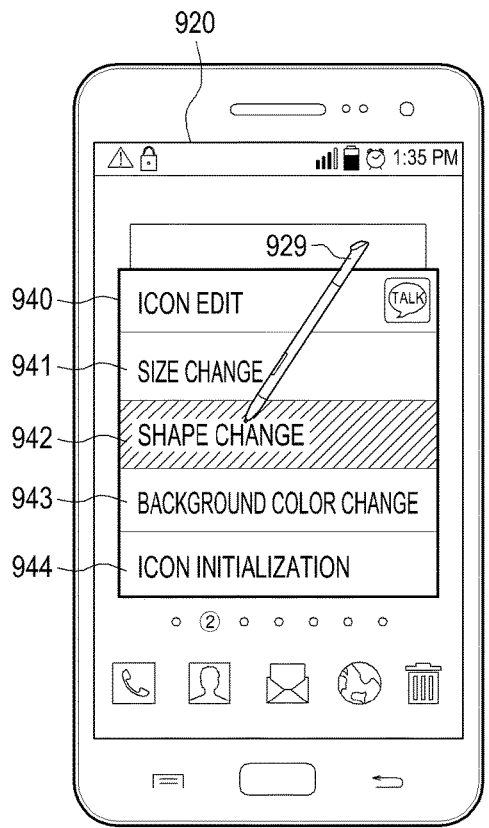
FIG. 9K is a diagram illustrating an example of selecting a shape change function of an icon from a plurality of functions according to an embodiment of the present invention.
Figure 9L:
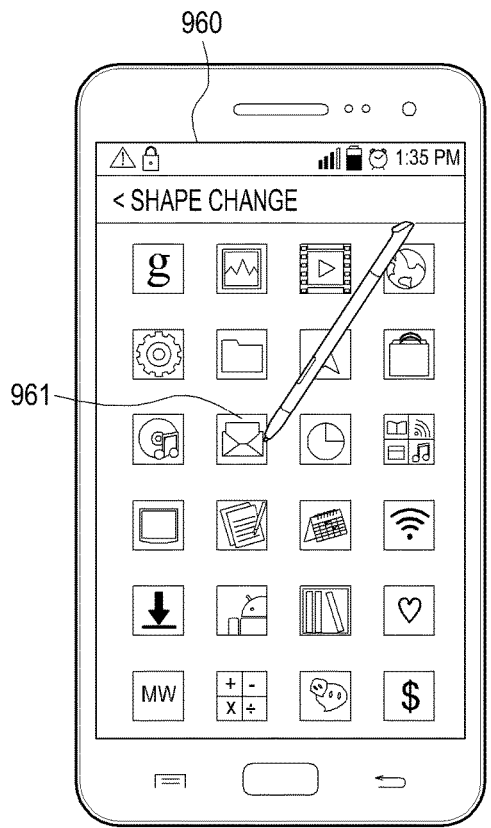
FIG. 9L is a diagram illustrating an example of displaying a plurality of icons applicable to a selected icon according to an embodiment of the present invention.
Figures 9M, 9N:
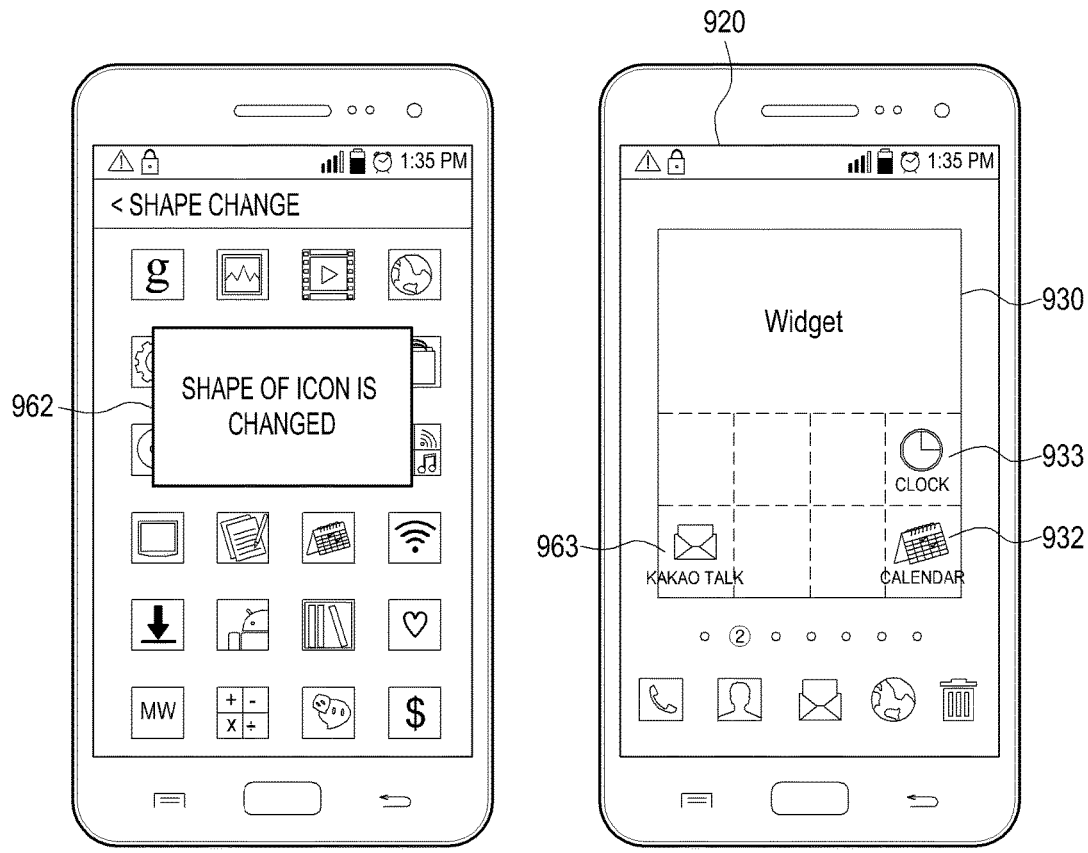
FIG. 9M is a diagram illustrating an example of displaying a pop-up window for informing an application result when selecting an icon desired to be applied to a selected icon according to an embodiment of the present invention.
FIG. 9N is a diagram illustrating an example of displaying, on a widget screen, a result obtained by applying another icon to a selected icon according to an embodiment of the present invention.
Figure 9O:
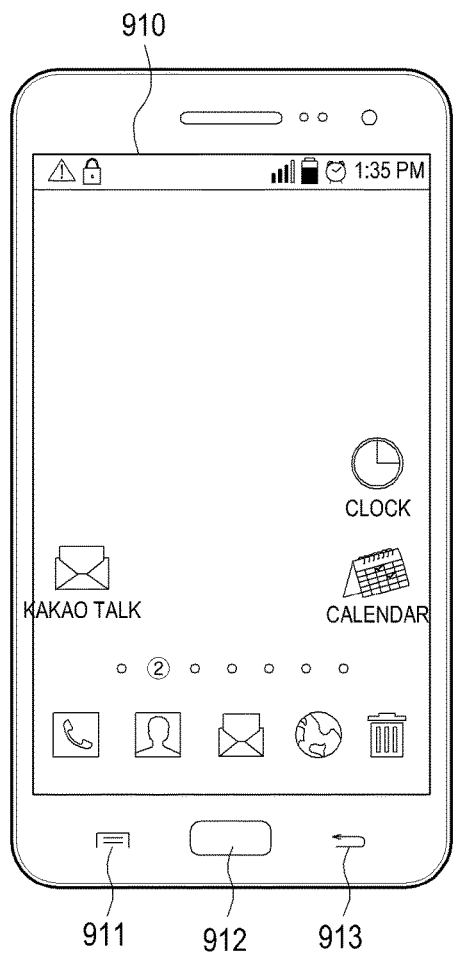
FIG. 9O is a diagram illustrating an example of displaying, on a touch screen, a result obtained by applying a selected icon to another icon according to an embodiment of the present invention.
Figure 9P:
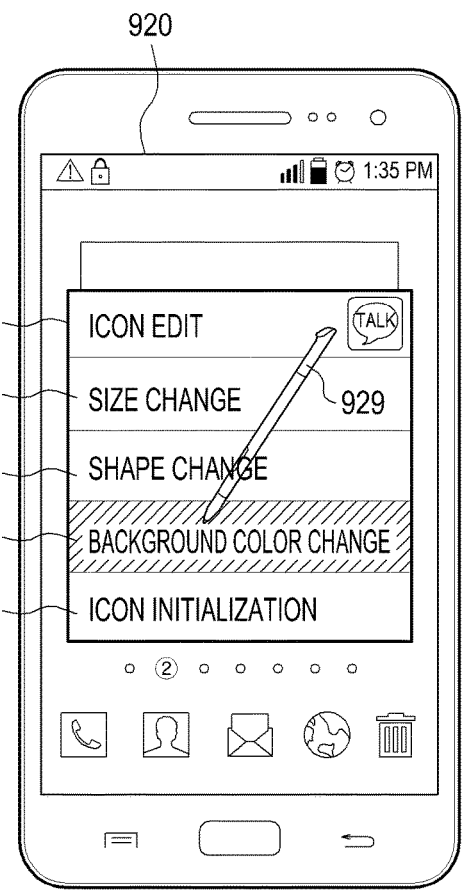
FIG. 9P is a diagram illustrating an example of selecting a background color change function of an icon from a plurality of functions according to an embodiment of the present invention.
Figure 9Q:
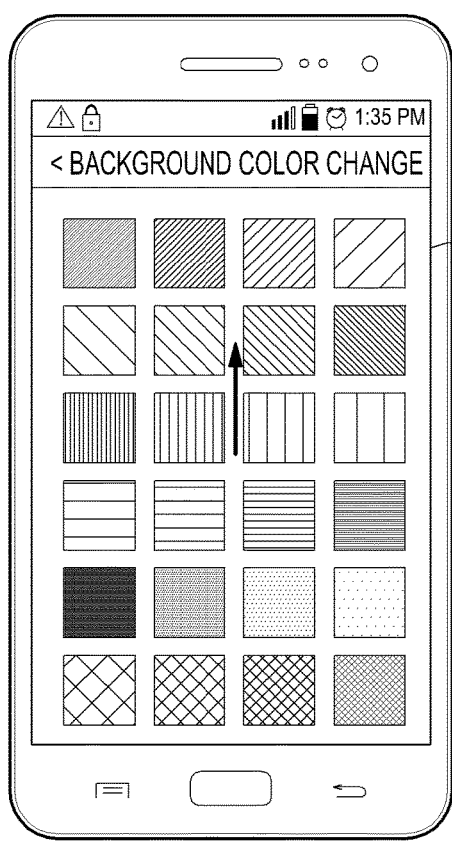
FIG. 9Q is a diagram illustrating an example of displaying colors applicable to an icon according to an embodiment of the present invention.
Figure 9R:
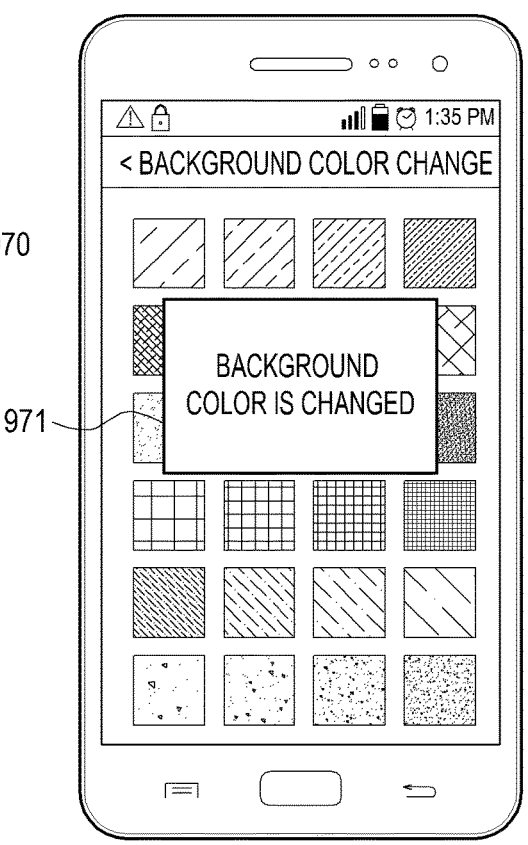
FIG. 9R is a diagram illustrating an example of displaying a pop-up window for informing an application result when applying a color to an icon according to an embodiment of the present invention.
Figures 9S, 9T:
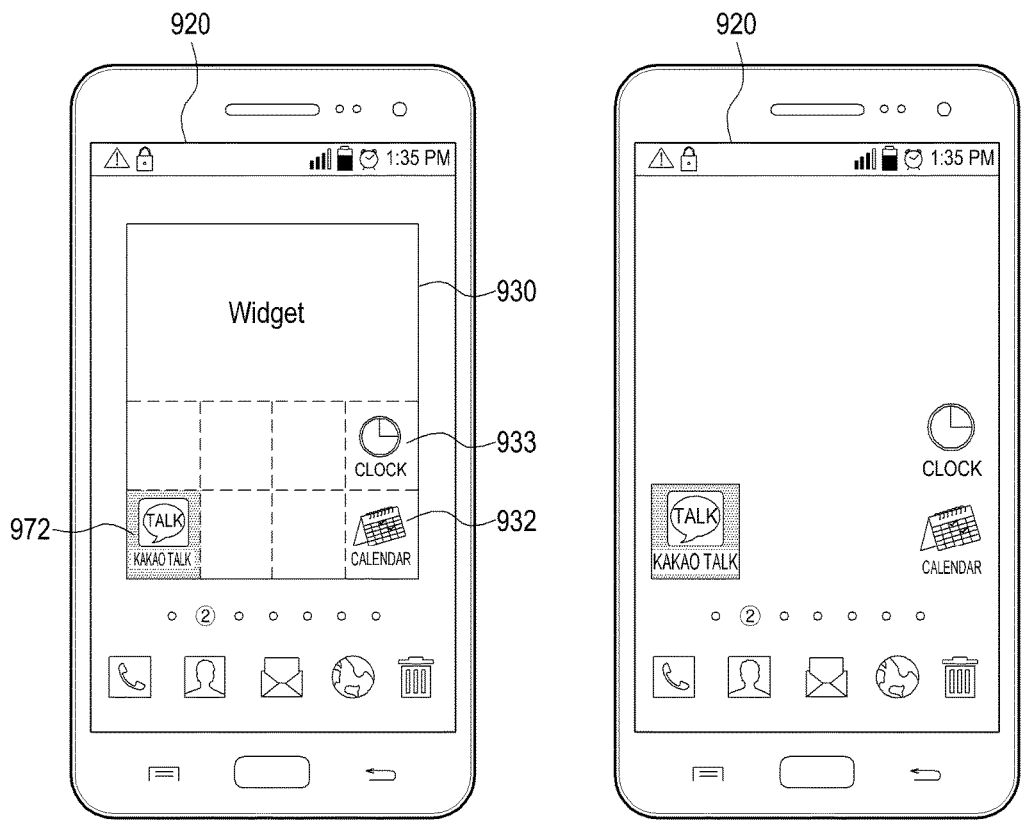
FIG. 9S is a diagram illustrating a result obtained by applying a color to an icon according to an embodiment of the present invention.
FIG. 9T is a diagram illustrating an example of displaying an icon to which a color is applied on a touch screen according to an embodiment of the present invention.
Figures 9U, 9V:
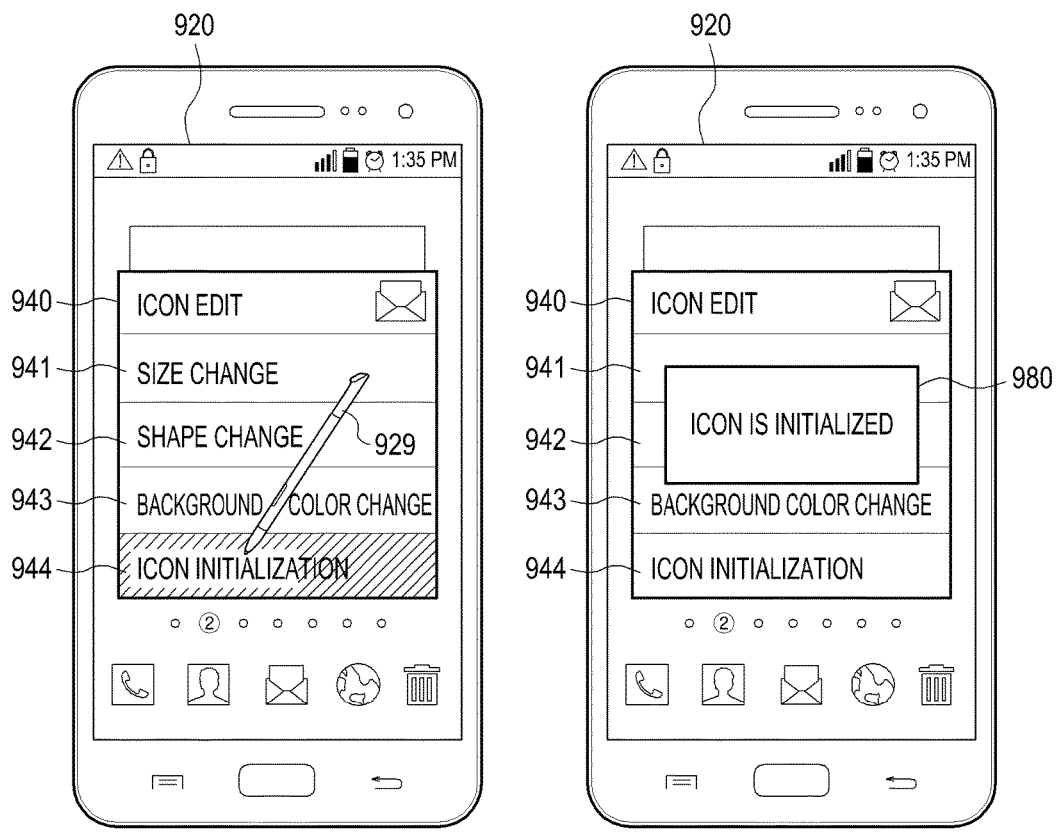
FIG. 9U is a diagram illustrating an example of selecting an icon initialization function for initializing an attribute applied to an icon from a plurality of functions according to an embodiment of the present invention.
FIG. 9V is a diagram illustrating an example of displaying a pop-up window for informing a result when initializing an icon according to an embodiment of the present invention.
Figures 9W, 9X:
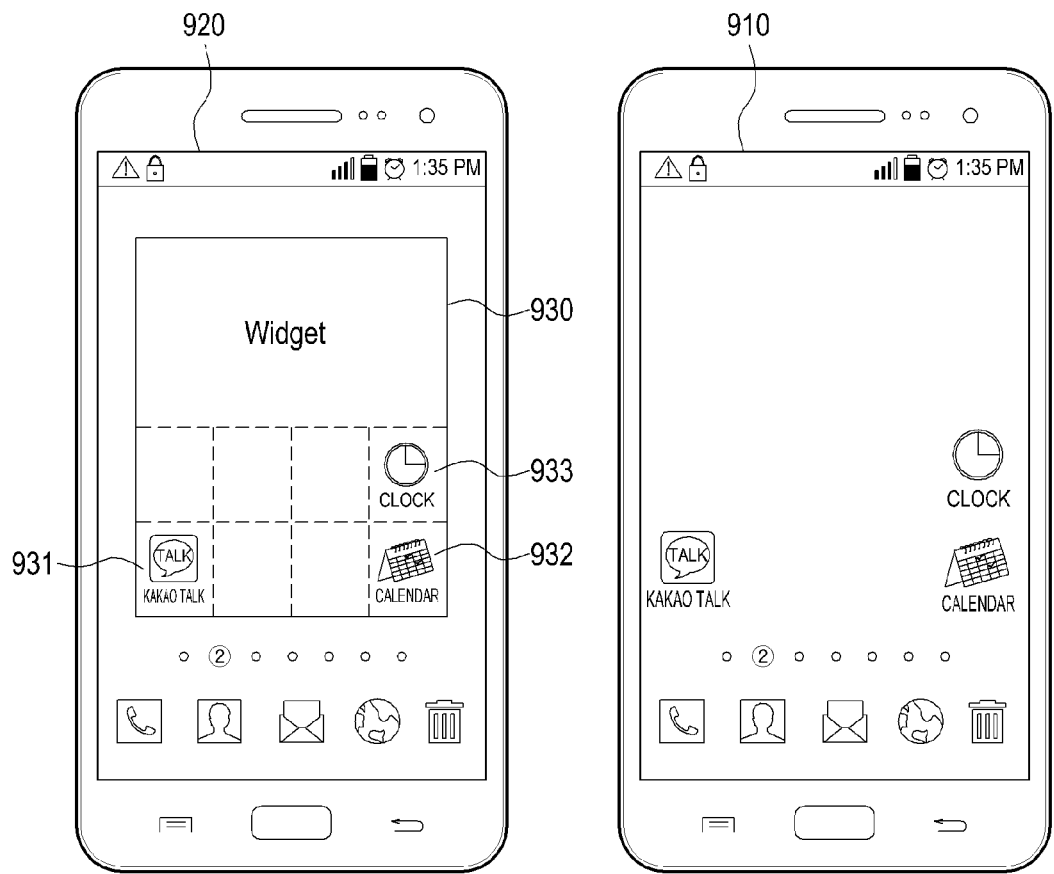
FIG. 9W is a diagram illustrating an example of showing a result obtained by initializing an icon according to an embodiment of the present invention.
FIG. 9X is a diagram illustrating a result obtained by displaying an initialized icon on a touch screen according to an embodiment of the present invention.

FIGS. 8A-8B are a flowchart illustrating a process of controlling an attribute of an icon according to an embodiment of the present invention, and FIGS. 9A-9X are diagrams illustrating an example of controlling an attribute of an icon according to an embodiment of the present invention.

FIG. 9A is a diagram illustrating an example of displaying at least one icon on a touch screen of a mobile terminal according to an embodiment of the present invention, FIG. 9B is a diagram illustrating a result obtained by executing a menu for controlling an attribute of an icon displayed on a touch screen according to an embodiment of the present invention, FIG. 9C is a diagram illustrating an example of displaying a widget screen when selecting an icon editing menu according to an embodiment of the present invention, FIG. 9D is a diagram illustrating an example of selecting an icon displayed on a widget screen according to an embodiment of the present invention, FIG. 9E is a diagram illustrating an example of displaying a plurality of functions applicable to a selected icon according to an embodiment of the present invention, FIG. 9F is a diagram illustrating an example in which a size change function of an icon is selected from a plurality of functions according to an embodiment of the present invention, FIG. 9G is a diagram illustrating an example of displaying a magnification applied to a size change of an icon according to an embodiment of the present invention, FIG. 9H is a diagram illustrating an example of displaying a pop-up window for informing an application result when applying a magnification to an icon according to an embodiment of the present invention, FIG. 9I is a diagram illustrating a result obtained by applying a magnification to an icon according to an embodiment of the present invention, FIG. 9J is a diagram illustrating a result obtained by displaying an icon to which a magnification is applied, on a touch screen according to an embodiment of the present invention, FIG. 9K is a diagram illustrating an example of selecting a shape change function of an icon from a plurality of functions according to an embodiment of the present invention, FIG. 9L is a diagram illustrating an example of displaying a plurality of icons applicable to a selected icon according to an embodiment of the present invention, FIG. 9M is a diagram illustrating an example of displaying a pop-up window for informing an application result when selecting an icon desired to be applied to a selected icon according to an embodiment of the present invention, FIG. 9N is a diagram illustrating an example of displaying, on a widget screen, a result obtained by applying another icon to a selected icon according to an embodiment of the present invention, FIG. 9O is a diagram illustrating an example of displaying, on a touch screen, a result obtained by applying a selected icon to another icon according to an embodiment of the present invention, FIG. 9P is a diagram illustrating an example of selecting a background color change function of an icon from a plurality of functions according to an embodiment of the present invention, FIG. 9Q is a diagram illustrating an example of displaying colors applicable to an icon according to an embodiment of the present invention, FIG. 9R is a diagram illustrating an example of displaying a pop-up window for informing an application result when applying a color to an icon according to an embodiment of the present invention, FIG. 9S is a diagram illustrating a result obtained by applying a color to an icon according to an embodiment of the present invention, FIG. 9T is a diagram illustrating an example of displaying an icon to which a color is applied on a touch screen according to an embodiment of the present invention, FIG. 9U is a diagram illustrating an example of selecting an icon initialization function for initializing an attribute applied to an icon from a plurality of functions according to an embodiment of the present invention, FIG. 9V is a diagram illustrating an example of displaying a pop-up window for informing a result when initializing an icon according to an embodiment of the present invention, FIG. 9W is a diagram illustrating an example of showing a result obtained by initializing an icon according to an embodiment of the present invention, FIG. 9X is a diagram illustrating a result obtained by displaying an initialized icon on a touch screen according to an embodiment of the present invention.

Hereinafter, a process of controlling an attribute of an icon according to an embodiment of the present invention will be described in detail with reference to FIGS. 8A, 8B, and 9A to 9X.

In steps S810 and S812, when a user desires to control an attribute of an icon, the user executes a control menu, and selects a menu button of a mobile terminal. The control menu may be executed by selection of the menu button of the mobile terminal or a configuration menu. In addition, the menu button may correspond to various menus such as a widget screen addition menu, a background change menu, a search menu, an editing menu, a configuration menu, and the like, in addition to an icon editing menu that edits a size of an icon.

Referring to FIG. 9A, a mobile terminal according to an embodiment of the present invention displays icons 921, 922, and 923 on a touch screen 910. These icons may include various icons as well as a kakao talk icon 921, a calendar icon 922, and a clock icon 923. A home button 912, a menu button 911, and a back button 913 may be formed on a lower portion of the mobile terminal. The home button 912 is located at the center of the lower portion of the mobile terminal and is selected to display a main home screen on the touch screen 190. The menu button 911 may be selected to display various menus such as a widget screen addition menu, a background change menu, a search menu, an editing menu, a configuration menu, and the like, in addition to the icon editing menu that edits the size of the icon. The back button 913 may be selected to display a screen that was executed immediately before a currently executed screen, or terminate the most recently used application.

Referring to FIG. 9B, when the menu button 911 is executed, a pop-up window is displayed. The pop-up window includes functions such as edition 924, page addition/deletion 925, folder addition 926, search 927, and configuration 928. The pop-up window may display other functions depending on the type of the mobile terminal. In step S810, when the user desires to control an icon, the user touches the edit function 924 among the functions included in the displayed pop-up window, using the input unit 929 or a user's finger.

Referring to FIG. 9C, a widget screen 930 is displayed on a touch screen 920 of the mobile terminal, and the displayed widget screen 930 displays a kakao talk icon 931, a calendar icon 932, and a clock icon 933. The widget screen 930 displays at least one icon corresponding to a function for controlling an icon on the touch screen. The widget screen 930 may be displayed as overlapped with the touch screen 920, or displayed separately. In addition, the widget screen 930 may be displayed separately on the touch screen, or displayed to be superimposed on a previously executed screen. The widget screen allocates a display region (i.e., a cell) to the at least one icon, and allocates the allocated single cell to the icon for display. The kakao talk icon 931, the calendar icon 932, and the clock icon 933 are icons displayed on an initial touch screen. In addition, according to an embodiment of the present invention, it is possible to display the icons displayed on the initial touch screen, or display an icon whose attribute is to be adjusted in response to a user's request. In FIG. 9C, when the icon (e.g., the kakao talk icon 931 of FIG. 9D) whose size is to be adjusted is selected using the input unit or a user's finger, the selected icon is activated.

When an arbitrary icon (e.g., the kakao talk icon 931) is selected using an input unit 929 as illustrated in FIG. 9D in a state in which at least one icon such as the kakao talk icon 931, the calendar icon 932, and the clock icon 933 is displayed on the displayed widget screen 930 as illustrated in FIG. 9c, a pop-up window 940 including a plurality of functions applicable to the selected icon is displayed as illustrated in FIG. 9E. The pop-up window 940 displays the plurality of functions applicable to the selected icon, and receives a selection of a function selected by the user among the plurality of functions. The pop-up window 940 includes a size change menu 941 that changes the size of an icon, the shape change menu 942 that changes a shape of an icon, a background color change menu 943 that changes a background color of an icon, and an icon initialization menu 944 that initializes an attribute applied to an icon.

In step S814, a function for controlling the icon selected in step S812 is selected. For example, when the icon 931 is selected in FIG. 9D, the pop-up window 940 including a function the user wants to be applied to the selected icon through the pop-up window 940 displayed in FIG. 9e is displayed, and a function the user wants to be controlled is selected from the displayed pop-up window 940. Hereinafter, each of the plurality of functions will be described in detail with reference to FIGS. 9F to 9X.

In steps S816 and 824, when the function selected in step S814 is a function for changing a size of an icon, changeable magnifications applied to the selected icon are displayed. More specifically, when the selected function is a function for adjusting a size of the selected icon, magnifications to be applied to the selected icon are displayed on the widget screen. The display of the magnifications is provided to enable the user to adjust the size of the selected icon according to a magnification selected from the displayed magnifications. In addition, the magnifications include magnifications that are applicable to the selected icon and displayed in an activated manner and magnifications that are not applicable to the selected icon and displayed in an inactivated manner. The activation and inactivation are divided according to whether the selected icon is overlapped with an adjacent icon.

First, when the size change menu 941 is selected using the input unit 929 as illustrated in FIG. 9F in order to select the size change menu 941 for changing the size of the icon, magnifications applicable to the selected icon are displayed through a size change pop-up window 950 as illustrated in FIG. 9G. The size change pop-up window 950 that displays the magnifications applicable to the selected icon is indicated by length×width, and includes a magnification 951 of 1×1, a magnification 952 of 2×2, a magnification 953 of 3×3, a magnification 954 of 4×4, . . . , and the like. As illustrated in FIG. 9g, 1×1, 2×2, and 3×3 are activated, and 4×4 is inactivated. 4×4 is inactivated, because a magnification of the selected icon 931 can only be magnified to a maximum of 3×3. These activated magnifications do not affect the adjacent icons 932 and 933, by which the corresponding icon and the adjacent icons (i.e., the calendar icon 932 and the clock icon 933) are not overlapped with each other.

In steps S826 and 828, when a magnification desired to be applied is selected from the displayed magnifications in step S824, the size of the icon is changed according to the selected magnification, and the icon is displayed.

When the magnification 952 of 2×2 is selected from the plurality of magnifications in FIG. 9G, a window (i.e., window 955 of FIG. 9H) for informing a change in the size of the icon is displayed. FIG. 9H illustrates an example in which the size of the selected icon is changed to correspond to the magnification selected in FIG. 9G. In FIG. 9H, the window for informing the change in the size of the icon may be displayed to be superimposed on the size change pop-up window 950. FIG. 9I illustrates a result by applying the magnification (that is, 2×2) selected in FIG. 9G to the corresponding icon. The icon 931 selected in FIG. 9D is changed to an icon 956 that is magnified according to the magnification of 2×2, and the icon 956 is displayed on the widget screen 930, as illustrated in FIG. 9I. FIG. 9J illustrates a result obtained by displaying the icon to which the selected magnification is applied on the touch screen. The size of the icon 931 selected in FIG. 9D is enlarged relative to other icons (i.e., the calendar icon 932 and the clock icon 933).

In steps 818 and 830, when the function selected in step S814 is a function for changing a shape of an icon, an icon to be changed is displayed on the selected icon. More specifically, when the selected function is a function for adjusting a shape of the selected icon, a plurality of icons applicable to the selected icon are displayed. This display of the plurality of icons is to change the shape of the icon to that of the icon selected from the plurality of icons.

First, when the shape change menu 942 is selected by the input unit 929 as illustrated in FIG. 9K in order to select the shape change menu 942 for changing the shape of the icon, a plurality of icons applicable to the selected icon are displayed on the touch screen 960 as illustrated in FIG. 9L. The touch screen 960 displays the plurality of icons applicable to the selected icon, and receives a selection of an arbitrary icon through an input unit or a user's finger.

In steps S832 and 834, when the icon desired to be changed is selected, the selected icon is applied as the icon desired to be changed for display. As illustrated in FIG. 9L, in a state in which the plurality of icons are displayed on the touch screen 960, the icon 931 selected in FIG. 9D is applied as the icon 961 selected in FIG. 9L, a pop-up window 962 for informing a change in the shape of the icon is displayed as illustrated in FIG. 9M, and the application result is shown in the widget screen 930 of FIG. 9N. FIG. 9N illustrates a result obtained by applying an icon desired to be changed to the widget screen, and FIG. 9O illustrates a result obtained by displaying an icon desired to be changed on the touch screen.

In steps S820 and S836, when the function selected in step S814 is a function for changing a background color of an icon, a background color desired to be applied to the selected icon is displayed. More specifically, when the selected function is the function for changing the background color of the selected icon, a plurality of colors applicable to the selected icon are displayed. The plurality of colors is displayed to enable the user to change the color of the background to the color selected from the plurality of colors.

First, when the background color change menu 943 is selected by the input unit 929, as illustrated in FIG. 9P, in order to select the background change menu 943 for changing the background color of the icon, a plurality of background colors applicable to the selected icon are displayed on the touch screen 970 as illustrated in FIG. 9Q. The touch screen 970 displays the plurality of background colors applicable to the selected icon, and receives a selection of a color selected by the user through the input unit or a user's finger.

In steps S838 and S840, when the color desired to be changed is selected, the selected color is applied to the icon for display. In a state in which the plurality of colors are displayed on the touch screen 970 as illustrated in FIG. 9Q, the background color of the icon 931 selected in FIG. 9d is applied as the color selected in FIG. 9Q (972 of FIG. 9S), a pop-up window 971 for informing a change in the background color of the selected icon is displayed as illustrated in FIG. 9R, and the application result is shown in the widget screen 930 of FIG. 9S. FIG. 9S illustrates a result obtained by applying the icon whose background color is changed to the widget screen with dashed lines surrounding each cell, and FIG. 9T illustrates a result obtained by displaying the icon whose background color is changed on the touch screen.

In steps S822 and S842, when the function selected in step S814 is a function for initializing an attribute of an icon, the function applied to the selected icon is released. That is, when the selected function is the function for initializing the attribute applied to the selected icon, at least one attribute applied to the selected icon is initialized and displayed.

The attribute of the icon includes, as described above, a size change, a shape change, and a background color change of the icon, and initialization refers to returning these changes to their original states before the changes take place.

In step S844, when the function applied to the icon selected in step S842 is released, the screen of the mobile terminal returns to a screen showing the initially set icon.

FIG. 9V illustrates an example of displaying a pop-up window 980 for informing initialization of the icon when an icon initialization function 944 is selected from among functions from a screen illustrated in FIG. 9U. The pop-up window 980 may be displayed to be superimposed on the icon editing menu 940. The widget screen 930 of FIG. 9W initializes the icon whose function is changed such as the icon 956 whose size is changed in FIG. 9I, the icon 963 whose shape is changed in FIG. 9N, and the icon 972 whose background color is changed in FIG. 9S, and displays the initialized icon. That is, the widget screen 930 of FIG. 9W displays the icon 931 in which these functions are initialized. FIG. 9X illustrates a result obtained by displaying the initialized icon on the touch screen 910.

Figure 10:
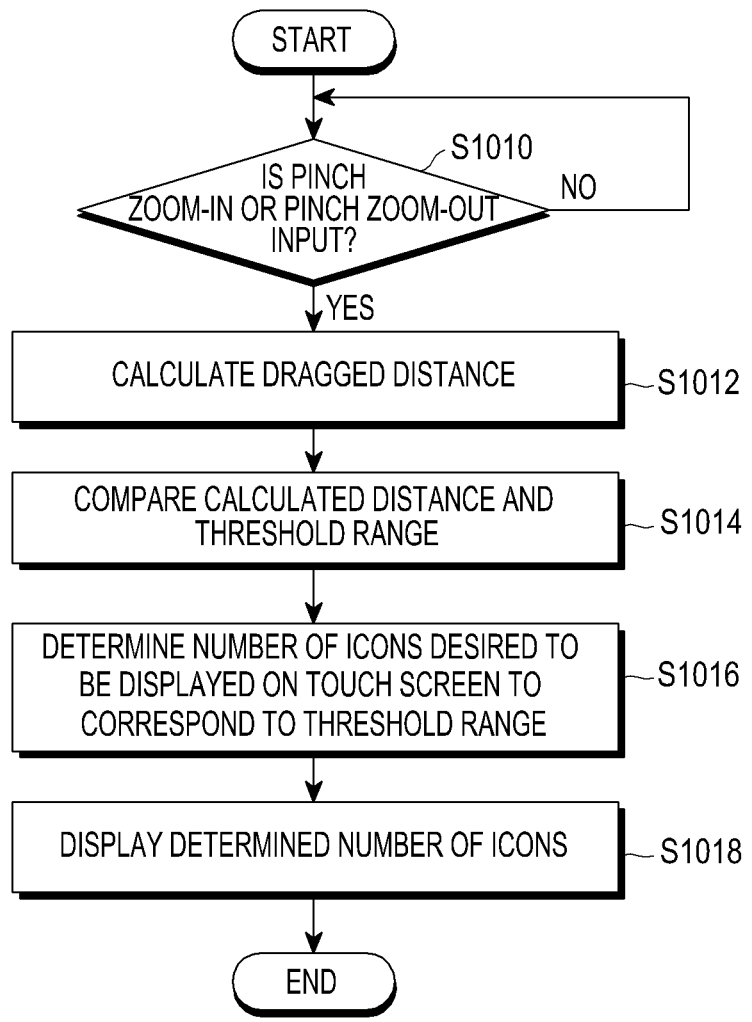
FIG. 10 is a flowchart illustrating a process of controlling a touch screen according to an embodiment of the present invention.

FIG. 10 is a flowchart illustrating a process of controlling a touch screen according to an embodiment of the present invention, and FIG. 11A to FIG. 11H are diagrams illustrating a process of controlling a touch screen according to an embodiment of the present invention.

Figures 11A, 11B:
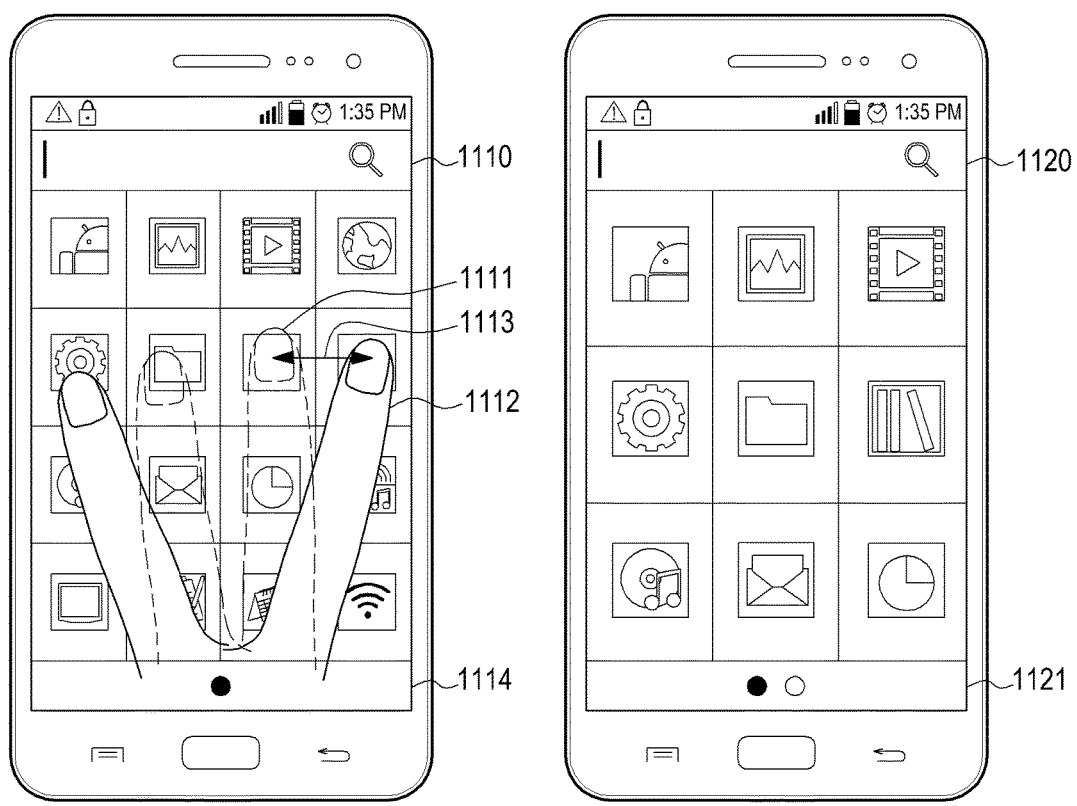
FIG. 11A is a diagram illustrating an example of inputting a pinch zoom-in to a touch screen according to an embodiment of the present invention.
FIG. 11B is a diagram illustrating a result that is displayed by a pinch zoom-in input to a touch screen according to an embodiment of the present invention.
Figure 11C:
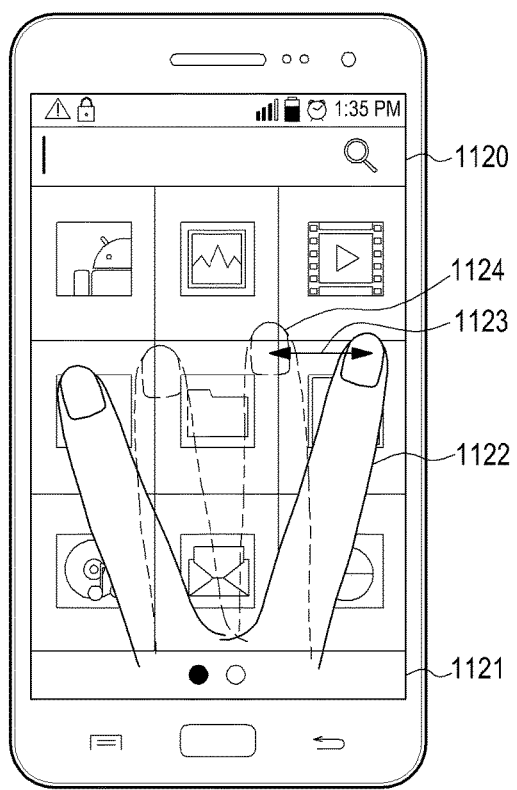
FIG. 11C is a diagram illustrating an example of inputting a pinch zoom-in to the touch screen of FIG. 11B.
Figure 11D:
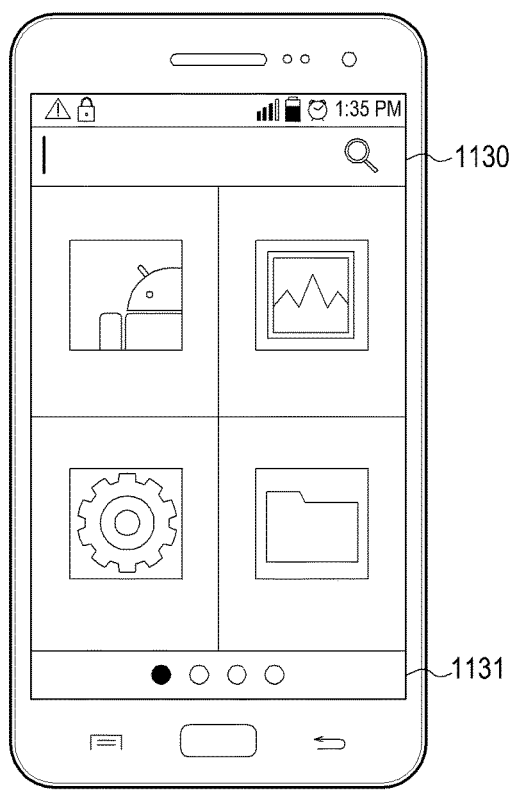
FIG. 11D is a diagram illustrating a result that is displayed by the pinch zoom-in of FIG. 11C.
Figures 11E, 11F:
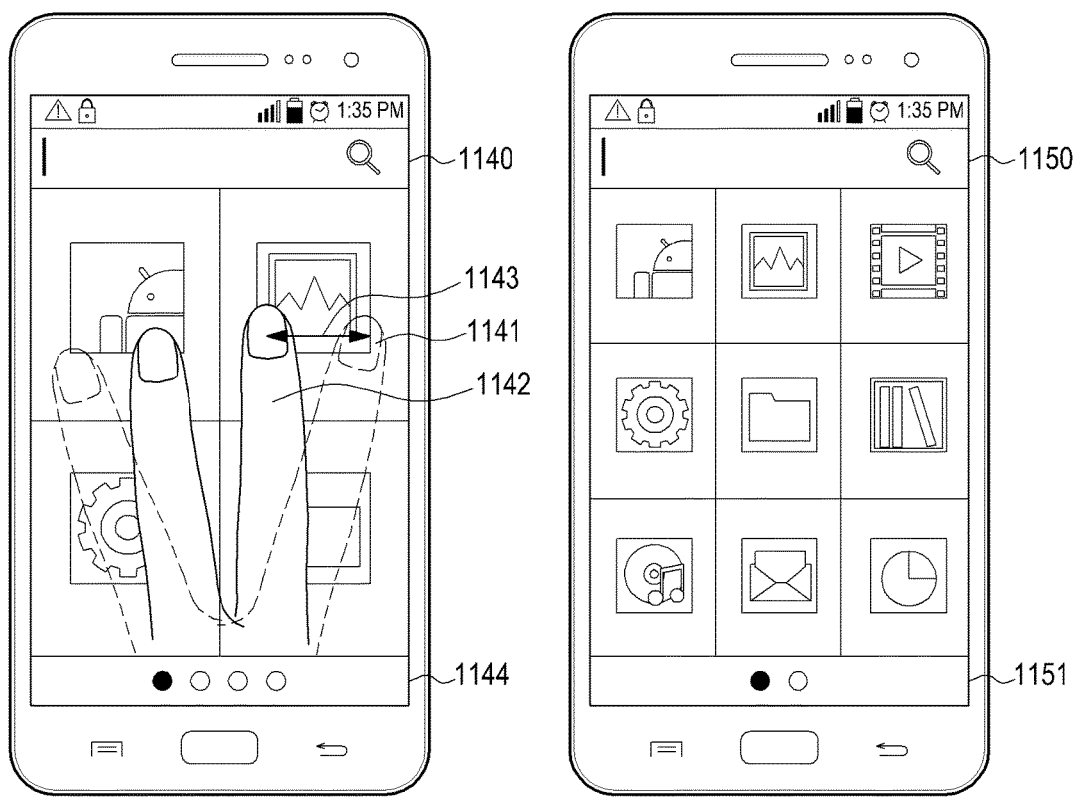
FIG. 11E is a diagram illustrating an example of inputting a pinch zoom-out to a touch screen according to an embodiment of the present invention.
FIG. 11F is a diagram illustrating a result that is displayed by a pinch zoom-out input to a touch screen according to an embodiment of the present invention.
Figures 11G, 11H:
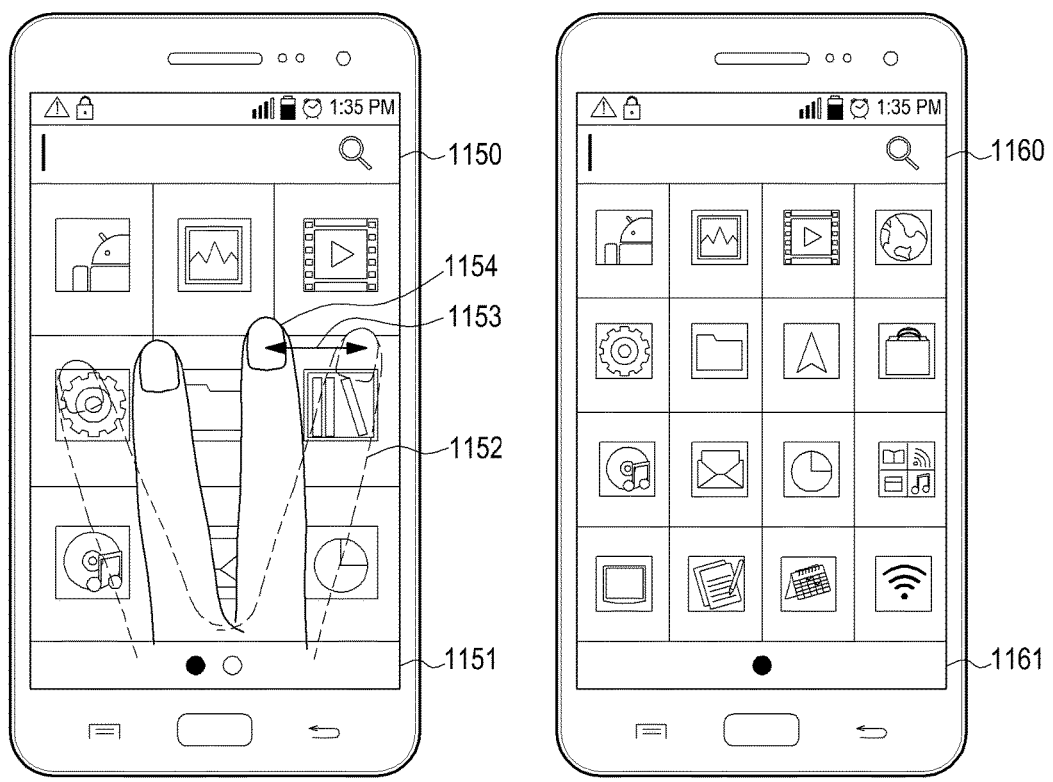
FIG. 11G is a diagram illustrating an example of inputting a pinch zoom-out to the touch screen of FIG. 11F.
FIG. 11H is a diagram illustrating a result that is displayed by the pinch zoom-in of FIG. 11G.

Referring to FIG. 11A is a diagram illustrating an example of inputting a pinch zoom-in to a touch screen according to an embodiment of the present invention, FIG. 11B is a diagram illustrating a result that is displayed by a pinch zoom-in input to a touch screen according to an embodiment of the present invention, FIG. 11C is a diagram illustrating an example of inputting a pinch zoom-in to the touch screen of FIG. B, FIG. 11D is a diagram illustrating a result that is displayed by the pinch zoom-in of FIG. 11c, FIG. 11E is a diagram illustrating an example of inputting a pinch zoom-out to a touch screen according to an embodiment of the present invention, FIG. 11F is a diagram illustrating a result that is displayed by a pinch zoom-out input to a touch screen according to an embodiment of the present invention, FIG. 11G is a diagram illustrating an example of inputting a pinch zoom-out to the touch screen of FIG. 11F, and FIG. 11H is a diagram illustrating a result that is displayed by the pinch zoom-in of FIG. 11G.

Hereinafter, a process of controlling a touch screen according to an embodiment of the present invention will be described in detail with reference to FIGS. 10 and 11A to 11H.

In steps S1010 and S1012, when a pinch zoom-in or a pinch zoom-out, which simultaneously touches two points, occurs on the touch screen and is detected by the controller 110, a distance dragged by the pinch zoom-in or the pinch zoom-out is calculated. When the touch is input, the controller 110 adjusts the number of icons displayed on the touch screen, and adjusts the number of pages displayed on the touch screen to correspond to the adjusted number of icons. The touch screen may display previous or subsequent pages by the input unit or dragging of a user's finger, and a plurality of pages may be generated to correspond to the number of icons. When the touch is the pinch zoom-in, the controller 110 displays the predetermined number of icons on the touch screen to correspond to the distance dragged by the pinch zoom-in. The number of pages displayed by the pinch zoom-in is increased because the number of icons displayed on a single page is reduced. By contrast, when the touch is the pinch zoom-out, the controller 110 displays the predetermined number of icons on the touch screen to correspond to a distance dragged by the pinch zoom-out, and the number of pages is reduced. In this manner, the pinch zoom-in results in a display smaller number of icons on the touch screen compared to the pinch zoom-out. In addition, when the touch is a dragging movement from a first point to a second point, the controller 110 displays a predetermined page to correspond to the dragged distance.

Referring to FIG. 11A, when a pinch zoom-in (a movement from a position 1111 to a position 1112) is input on the touch screen 1110, the number of icons displayed on the touch screen is reduced from 16 icons of FIG. 11A to 9 icons of FIG. 11B. When a pinch zoom-in (a movement from a position 1124 to a position 1122) is further input, the number of icons displayed on the touch screen is reduced from 9 icons, as shown in FIG. 11C to 4 icons of FIG. 11D. The number of pages is increased to correspond to the reduced number of icons. More specifically, in FIG. 11A, a total of 16 icons are displayed on a single page 1114, but 4 icons are displayed on the touch screen by the pinch zoom-in as illustrated in FIG. 11D, and the number of pages 1131 is increased to 4. Through the pinch zoom-in and zoom-out operations, the number of pages is increased or reduced to correspond to the number of the displayed icons without a reduction in the overall number of icons. In FIG. 11B, 9 icons are displayed on a touch screen 1120 by a single pinch zoom-in in FIG. 11A, and in FIG. 11D, 4 icons are displayed on a touch screen 1130 by a single pinch zoom-in in FIG. 11C. In this manner, the controller 110 may calculate distances 1113 and 1123 which are dragged by the pinch zoom-in, thereby determining an icon desired to be displayed. In addition, the controller 110 calculates distances dragged by the pinch zoom-out as illustrated in FIGS. 11E and 11G as well as the distances dragged by the pinch zoom-in as illustrated in FIGS. 11A and 11C.

More specifically, referring to FIG. 11E, when a pinch zoom-out (a movement from a position 1141 to a position 1142) is input on a touch screen 1140, the number of icons displayed on the touch screen is increased from 4 icons of FIG. 11E to 9 icons of FIG. 11F. When a pinch zoom-out (a movement from a position 1152 to a position 1154 is further input, the number of icons displayed on the touch screen is increased from 9 icons of FIG. 11G to 16 icons of FIG. 11H. Here, the number of pages is reduced to correspond to the increased number of icons. That is, in FIG. 11E, a total of 4 icons are displayed on 4 pages 1144, but the number of icons displayed on the touch screen is 16 by the pinch zoom-out as illustrated in FIG. 11H, but the number of the pages 1161 is reduced to one. Through this change, the number of pages is increased or reduced to correspond to the number of the displayed icons without a reduction in the overall number of icons. In FIG. 11F, 9 icons are displayed on a touch screen 1150 by a single pinch zoom-out in FIG. 11E, and in FIG. 11H, 16 icons are displayed on a touch screen 1160 by a single pinch zoom-out in FIG. 11G. In this manner, the controller 110 may calculate distances 1143 and 1153 which are dragged by the pinch zoom-out, thereby determining a number of icons intended to be displayed.

When the pinch zoom-in or the pinch zoom-out is input as described above, the controller 110 calculates a distance dragged by the input pinch zoom-in or pinch zoom-out, and controls a page view to correspond to the calculated distance.

In steps S1014 and S1016, the compared distance and a predetermined threshold range are compared in step S1012, and the number of icons desired to be displayed on the touch screen is determined to correspond to the threshold range. For example, when a pinch zoom-in corresponding to a larger distance than the distance 1113 dragged by the pinch zoom-in input in FIG. 11A is input, a smaller number of icons (for example, 4 icons) than the number icons shown in FIG. 11B may be displayed. Embodiments of the present invention may also be applied to the opposite case. For example, when a pinch zoom-out corresponding to a larger distance than the distance 1143 dragged by the pinch zoom-out input in FIG. 11E is input, a greater number of icons (e.g., 16 icons) than that of the icons (e.g. 9 icons) shown in FIG. 11F is displayed.

In step S1018, the number of icons determined in step S1016 is displayed.

Figure 12:
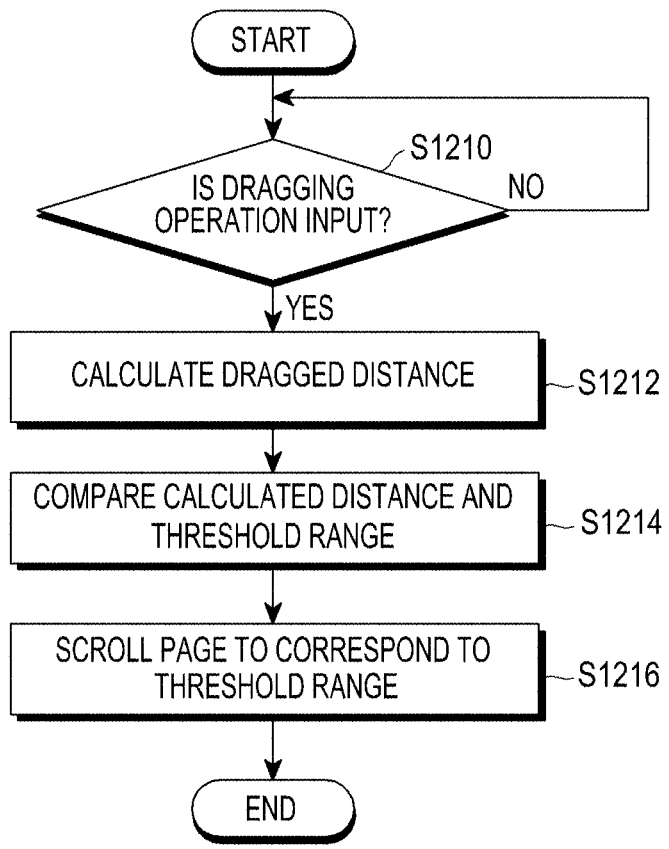
FIG. 12 is a flowchart illustrating a method of scrolling a page displayed on a touch screen according to an embodiment of the present invention.

FIG. 12 is a flowchart illustrating a method of scrolling a page displayed on a touch screen according to an embodiment of the present invention, and FIGS. 13A to 13D are diagrams illustrating a method of scrolling a page displayed on a touch screen according to an embodiment of the present invention.

Figures 13A, 13B:
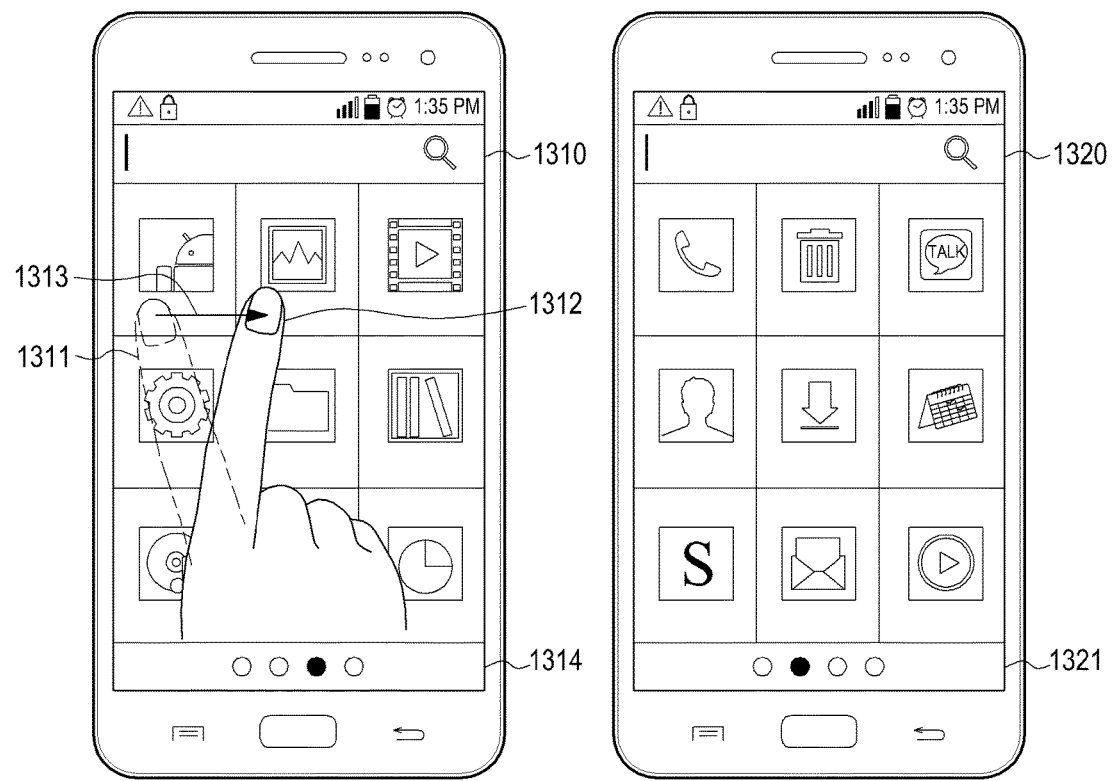
FIG. 13A is a diagram illustrating an example of inputting a dragging operation using a touch on a touch screen according to an embodiment of the present invention.
FIG. 13B is a diagram illustrating a result that is displayed by a touch through the dragging operation of FIG. 13a on a touch screen according to an embodiment of the present invention.
Figures 13C, 13D:
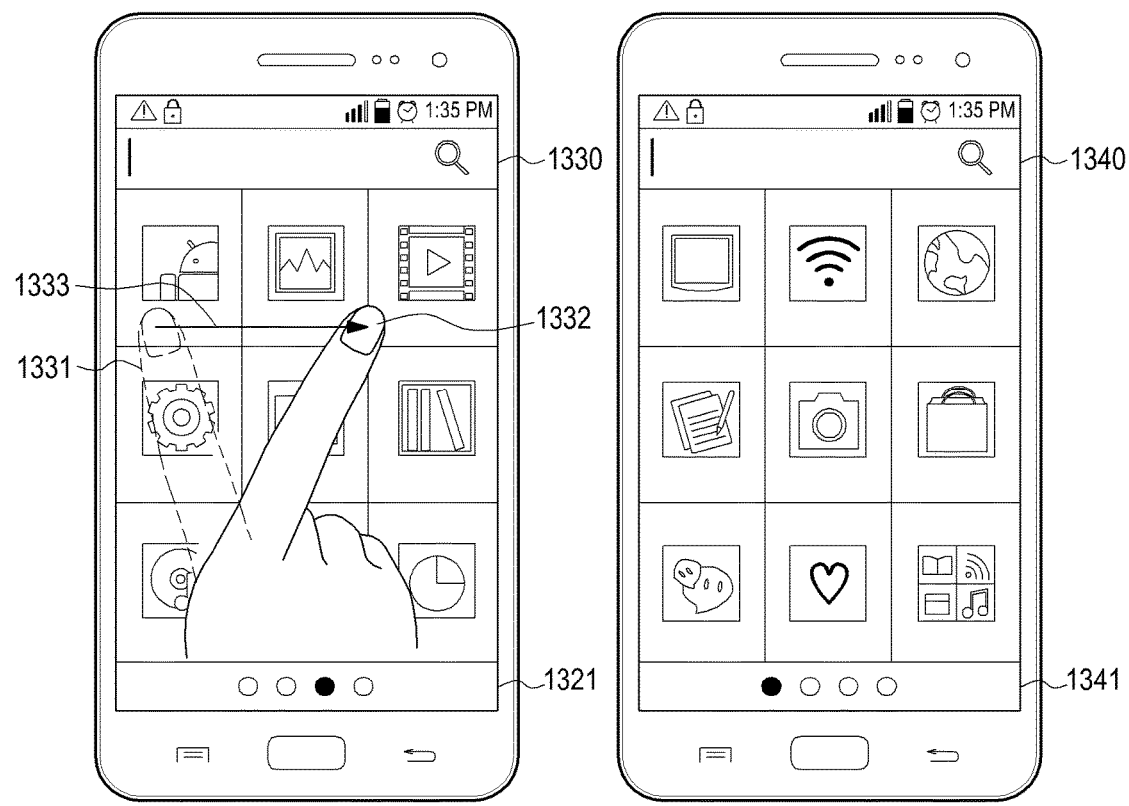
FIG. 13C is a diagram illustrating an example of inputting a drag using a touch to a touch screen according to another embodiment of the present invention.
FIG. 13D is a diagram illustrating a result that is displayed by a touch through the dragging operation of FIG. 13C on a touch screen according to an embodiment of the present invention.

FIG. 13A is a diagram illustrating an example of inputting a dragging operation using a touch on a touch screen according to an embodiment of the present invention, FIG. 13B is a diagram illustrating a result that is displayed by a touch through the dragging operation of FIG. 13A on a touch screen according to an embodiment of the present invention, FIG. 13C is a diagram illustrating an example of inputting a drag using a touch to a touch screen according to another embodiment of the present invention, and FIG. 13D is a diagram illustrating a result that is displayed by a touch through the dragging operation of FIG. 13C on a touch screen according to an embodiment of the present invention.

Hereinafter, a method of scrolling a page displayed on a touch screen according to an embodiment of the present invention will be described in detail with reference to FIGS. 12 and 13A to 13D.

In steps S1210 and S1212, when a dragging operation for scrolling a page on a touch screen is input, the dragged distance is calculated. When the dragging operation is input on the touch screen, the controller 110 calculates a distance between an initial touch point (i.e., a first point) of the dragging operation and a touch point (i.e., a second point) in which the dragging operation is completed, and controls the display of a predetermined page to correspond to the dragged distance.

Referring to FIG. 13A, the dragging operation may be input by a user's finger 1311 or 1312, and the dragging operation is moved from the left side to the right side. Alternatively, the dragging operation may be input from the right side to the left side. When the dragging operation is input, the controller 110 calculates a dragged distance 1313, and displays, on the touch screen, an icon existing in the direction opposite to the movement direction of the finger to correspond to the calculated distance. More specifically, when the dragging operation is input in FIG. 13A, the controller 110 displays icons existing on the left side of the icon displayed in FIG. 13A, as illustrated in FIG. 13B. This can be seen through a change in the page displayed in FIG. 13A (a change from a page 1314 of FIG. 13A to a page 1321 of FIG. 13B). In addition, referring to FIG. 13C, the dragging operation is moved from the left side 1331 to the right side 1332. Alternatively, the dragging operation may be input from the right side to the left side. When the dragging operation (i.e., a movement from the left side 1331 to the right side 1332) is input, the controller 110 calculates a dragged distance 1333, and displays, on the touch screen, an icon existing in the direction opposite to the movement direction of the finger to correspond to the calculated distance. More specifically, when the dragging operation is input in FIG. 13C, the controller 110 displays icons existing on the left side of the icon displayed in FIG. 13C, as illustrated in FIG. 13D. This can be seen through a change in the page displayed in FIG. 3C (a change from a page 1321 of FIG. 13C to a page 1341 of FIG. 13D). A page scrolling operation from FIG. 13C to FIG. 13D is longer than a page scrolling operation from FIG. 13A to FIG. 13B, because the dragged distance 1333 in FIG. 13C is longer than the dragged distance 1313 in FIG. 13A. In this manner, the page is scrolled differently depending on the dragged distance. More specifically, when the dragged distance is short, the immediately previous page is displayed, and when the dragged distance is long, the more previous page is displayed, compared to when the dragged distance is short.

In steps S1214 and S1216, the dragged distance calculated in step S1212 and a predetermined threshold range are compared, and a page is scrolled to correspond to the threshold range. For example, when the dragged distance is less than 10 mm, a single page is scrolled to be displayed, when the dragged distance is 10 mm to 20 mm, two pages are scrolled to be displayed, when the dragged distance is 20 mm to 30 mm, three pages are scrolled to be displayed, and when the dragged distance is 30 mm to 40 mm, four pages are scrolled to be displayed. This threshold range is merely an example, and threshold ranges of the dragged distances may be adjusted or variable in accordance with embodiments of the present invention. In this manner, the dragged distance and the predetermined threshold range are compared, and a page after scrolling the page corresponding to the corresponding range is displayed. That is, the scrolled page is proportional to the dragged distance.

It may be appreciated that embodiments of the present invention may be implemented in software, hardware, or a combination thereof. Any such software may be stored, for example, in a volatile or non-volatile storage device such as a ROM, a memory such as a RAM, a memory chip, a memory device, or a memory Integrated Circuit (IC), or a recordable optical or magnetic medium such as a CD, a DVD, a magnetic disk, or a magnetic tape, regardless of its ability to be erased or its ability to be re-recorded. A memory that may be included in the mobile terminal include examples of storage media suitable for storing a program or programs including instructions by which the embodiments of the present invention are realized. Accordingly, embodiments of the present invention may include a program that includes a code for implementing an apparatus or a method defined in any claim in the present specification and a machine-readable storage medium that stores such a program. Further, the program may be electronically transferred by a predetermined medium, such as a communication signal transferred through a wired or wireless connection, and embodiments of the present invention include equivalents of the program.

Moreover, the above-described mobile terminals can receive programs from a program provision device that is connected to the mobile terminal in a wired or wireless manner, and store the program. The program providing apparatus may include a memory for storing a program containing instructions for allowing the camera apparatus to perform a preset content protecting method and information required for the content protecting method, a communication unit for performing wired or wireless communication with the camera apparatus, and a controller for transmitting the corresponding program to the camera apparatus according to a request of the camera apparatus or automatically While the invention has been shown and described with reference to certain embodiments thereof, various changes in form and details may be made therein without departing from the spirit and scope of the invention. Therefore, the scope of the present invention is defined as being limited to the above-described embodiments, but is defined by the appended claims and their equivalents.

The invention claimed is:

1. A method for controlling icons of a mobile terminal, the method comprising:
   receiving a first user input for changing a size of at least one icon corresponding to at least one application, wherein the at least one icon is displayed on a first window;
   in response to receiving the first user input, displaying, on the first window, a second window which overlaps the first window and is for changing the size of the at least one icon displayed on the first window, wherein the first window includes a home screen and the second window includes a plurality of display areas divided by a plurality of lines;
   displaying the at least one icon in at least one display area among the plurality of display areas included in the second window, wherein a size of the displayed the at least one icon corresponds to a display area of the plurality of display areas divided by the plurality of lines;
   receiving a second user input for a selection of an icon to change a size of the selected icon from among the at least one icon displayed on the second window;
   receiving a third user input, wherein the third user input includes a drag starting from a side of the selected icon on the second window;
   in response to the receiving the third user input, determining whether, when the drag is released, the selected icon is displayable on the second window to at least partially overlap at least one adjacent icon displayed on the second window based on a release point of the drag on the second window and a direction of the drag;
   in response to the determining that, when the drag is released, the selected icon is displayable to at least partially overlap the at least one adjacent icon based on the release point of the drag and the direction of the drag, displaying a graphical effect on the at least one adjacent icon;
   in response to the drag being released on the release point, adjusting the size of the selected icon on the second window not to at least partially overlap the at least one adjacent icon and to meet at least one boundary of the at least one adjacent icon based on the direction of the drag, on the plurality of display areas divided by the plurality of lines, and on a location of the at least one adjacent icon, while maintaining the location of the at least one adjacent icon and a size of the at least one adjacent icon on the second window; and
   displaying the adjusted icon on the first window.

2. The method of claim 1, wherein adjusting the size of the selected icon comprises:
   reducing the size of the selected icon according to a distance of the drag in at least one of a vertical and horizontal advancing direction.

3. The method of claim 1, wherein the plurality of display areas have a variable size.

4. The method of claim 1, wherein the size of the selected icon is adjusted in real-time according to the drag.

5. A mobile terminal for controlling icons, the mobile terminal comprising:
   a touch screen; and
   a controller configured to:
      receive, through the touch screen, a first user input for changing a size of at least one icon corresponding to at least one application, wherein the at least one icon is displayed on a first window,
      in response to the receiving the first user input, display, through the touch screen, on the first window, a second window which overlaps the first window and is for changing the size of the at least one icon displayed on the first window, wherein the first window includes a home screen and the second window includes a plurality of display areas divided by a plurality of lines,
      display, through the touchscreen, the at least one icon in at least one display area among the plurality of display areas included in the second window, wherein a size the displayed the at least one icon corresponds to a display area of the plurality of display areas divided by the plurality of lines,
      receive, through the touch screen, a second user input for a selection of an icon to change the size of the selected icon from among the at least one icon displayed on the second window,
      receive, through the touch screen, a third user input, wherein the third user input includes a drag starting from a side of the selected icon on the second window,
      in response to the receiving the third user input, determine whether, when the drag is released, the selected icon is displayable on the second window to at least partially overlap at least one adjacent icon displayed on the second window based on a release point of the drag on the second window and a direction of the drag,
      in response to the determining that, when the drag is released, the selected icon is displayable to at least partially overlap the at least one adjacent icon based on the release point of the drag and the direction of the drag, display, through the touchscreen, a graphical effect on the at least one adjacent icon,
      in response to the drag being released on the release point, adjust the size of the selected icon on the second window not to at least partially overlap the at least one adjacent icon and to meet at least one boundary of the at least one adjacent icon based on the direction of the drag, on the plurality of display areas divided by the plurality of lines, and on a location of the at least one adjacent icon, while maintaining the location of the at least one adjacent icon and a size of the at least one adjacent icon on the second window, and display, through the touch screen, the adjusted icon on the first window.

6. The mobile terminal as claimed in claim 5, wherein the controller is further configured to reduce the size of the selected icon according to a distance of the drag in at least one of a vertical and horizontal advancing direction.

\* \* \* \* \*